United States Patent
Tsuboi

(10) Patent No.: US 11,071,169 B2
(45) Date of Patent: Jul. 20, 2021

(54) COMMUNICATION APPARATUS, CONTROL METHOD, AND STORAGE MEDIUM

(71) Applicant: CANON KABUSHIKI KAISHA, Tokyo (JP)

(72) Inventor: Satoru Tsuboi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/663,083

(22) Filed: Oct. 24, 2019

(65) Prior Publication Data

US 2020/0146101 A1 May 7, 2020

(30) Foreign Application Priority Data

Nov. 2, 2018 (JP) .............................. JP2018-207195

(51) Int. Cl.
*H04W 84/12* (2009.01)
*H04W 56/00* (2009.01)
(Continued)

(52) U.S. Cl.
CPC ........... *H04W 84/12* (2013.01); *H04W 8/005* (2013.01); *H04W 12/04* (2013.01); *H04W 12/06* (2013.01);
(Continued)

(58) Field of Classification Search
CPC ............. H04W 56/0045; H04W 56/00; H04W 56/001; H04W 84/18; H04W 12/08; H04W 12/10; H04W 24/02; H04W 36/0072; H04W 36/08; H04W 48/16; H04W 48/20; H04W 4/80; H04W 56/0015; H04W 88/08; H04W 12/003; H04W 12/00502; H04W 12/02; H04W 12/0608; H04W 40/244; H04W 40/246; H04W 40/248; H04W 56/0005; H04W 56/002; H04W 56/0055; H04W 72/04; H04W 72/0406; H04W 84/20; H04W 8/005; H04W 84/12; H04W 12/06; H04W 28/18; H04W 76/10; H04W 12/04; G06T 2207/10016; G06T 2200/04;
(Continued)

(56) References Cited

U.S. PATENT DOCUMENTS 8,463,239 B1 * 6/2013 Koller ............... H04M 1/72519
455/411
10,169,587 B1 * 1/2019 Nix ........................ H04L 9/0838
(Continued)

*Primary Examiner* — Daniel Lai
(74) *Attorney, Agent, or Firm* — Canon U.S.A., Inc., IP Division

(57) ABSTRACT

A communication apparatus and method are provided such that, if first information received by a first communication apparatus from a second communication apparatus corresponds to a first code stored in the first communication apparatus, the first code corresponding to time synchronization processing, a communication parameter for joining a network established by the first communication apparatus is provided to the second communication apparatus. If the first information does not corresponds to the first code, the communication parameter is not provided. The first communication apparatus cause the second communication apparatus participating in the network to execute the time synchronization processing using time information about the first communication apparatus.

17 Claims, 9 Drawing Sheets

(51) Int. Cl.
*H04W 12/06* (2021.01)
*H04W 28/18* (2009.01)
*H04W 48/16* (2009.01)
*H04W 8/00* (2009.01)
*H04W 76/10* (2018.01)
*H04W 12/04* (2021.01)
*H04W 84/18* (2009.01)

(52) U.S. Cl.
CPC .......... *H04W 28/18* (2013.01); *H04W 48/16* (2013.01); *H04W 56/0045* (2013.01); *H04W 76/10* (2018.02); *H04W 84/18* (2013.01)

(58) Field of Classification Search
CPC . G06T 2207/30221; G06T 7/292; G06T 7/70; G06T 7/97; H04L 67/1095; H04L 63/123; H04L 27/2656; H04L 65/1069; H04L 65/1083; H04L 65/4007; H04L 65/4023; H04L 65/403; H04L 65/4038; H04L 67/12; H04L 67/42; H04L 7/0004; H04L 7/0025; H04L 7/007; H04L 7/033; H04L 7/10; H04N 21/4307; H04N 5/04; H04N 21/41415; H04N 13/398; H04B 1/7073
See application file for complete search history.

(56) References Cited

U.S. PATENT DOCUMENTS

| | | | |
|---|---|---|---|
| 2005/0278618 A1* | 12/2005 | Ogikubo | ................. G11B 27/11 715/255 |
| 2016/0088209 A1 | 3/2016 | Tanaka | |
| 2016/0203315 A1* | 7/2016 | Wentz | ..................... G06F 21/44 726/4 |
| 2016/0262193 A1* | 9/2016 | Hariharan | ................ H04W 4/80 |
| 2019/0059068 A1* | 2/2019 | Neubauer | ............. H04W 64/00 |

* cited by examiner

COMMUNICATION APPARATUS, CONTROL METHOD, AND STORAGE MEDIUM

BACKGROUND

Field

The present disclosure relates to time synchronization processing of communication apparatuses.

Description of the Related Art

In recent years, more and more electronic devices, such as cameras and smartphones are implementing a wireless communication function and being used in connection with a wireless network. As a method for using a camera in connection with a wireless network, a plurality of cameras is connected to the same wireless network to synchronously capture images for synchronous imaging. To facilitate sorting pieces of image data collected by the plurality of cameras in time series, the plurality of cameras connected to the same wireless network performs time synchronization therebetween.

United States Patent Application Publication No. 2016/0088209 discusses a camera that is a master unit of time synchronization performing wireless communication with cameras that are slave units, and performing time synchronization with a user-selected camera that is a slave unit.

In performing time synchronization with another communication apparatus, a communication apparatus discussed in United States Patent Application Publication No. 2016/0088209 needs to receive a selection instruction to select another communication apparatus to perform the time synchronization with from the user. This complicates the operations.

SUMMARY

The present disclosure is directed to enabling a communication apparatus to perform time synchronization with another communication apparatus without receiving a user operation to select another communication apparatus to perform the time synchronization with from the user.

According to an aspect of the present disclosure, a communication apparatus includes a first establishment unit configured to establish a first wireless network and a first reception unit configured to receive first information from another communication apparatus, a first provision unit configured to provide a first communication parameter for joining the established first wireless network to the other communication apparatus in a case where a first code stored in the communication apparatus and corresponding to time synchronization processing corresponds to the received first information, and configured not to provide the first communication parameter to the other communication apparatus in a case where the first code does not correspond to the first information, and a synchronization unit configured to identify the other communication apparatus joining the first wireless network by using the provided first communication parameter, and cause the other communication apparatus identified to execute the time synchronization processing using time information of the communication apparatus.

Further features of the present disclosure will become apparent from the following description of exemplary embodiments with reference to the attached drawings.

DESCRIPTION OF THE EMBODIMENTS

Exemplary embodiments of the present disclosure will be described in detail below with reference to the accompanying drawings. Configurations described in the following exemplary embodiments are merely examples, and the present disclosure is not limited to the illustrated configurations.

Figure 1:
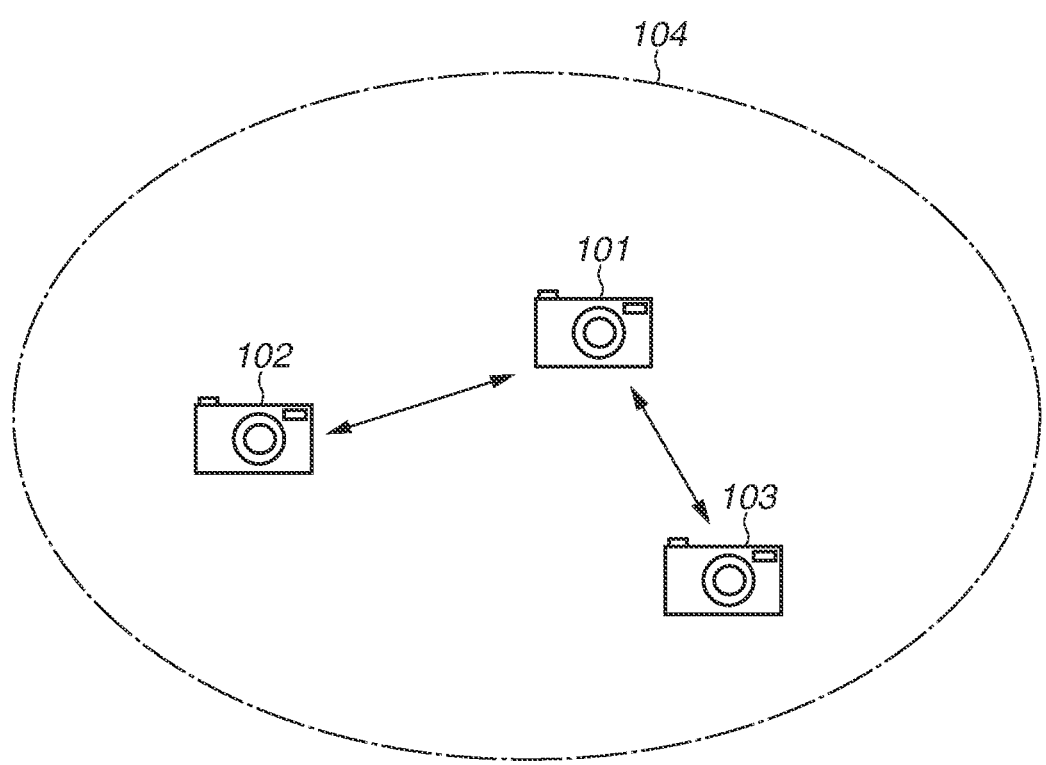
FIG. 1 is a diagram illustrating a network configuration of a communication system in which a communication apparatus 101 participates.

FIG. 1 illustrates a network configuration of a communication system in which a communication apparatus 101 according to the present exemplary embodiment participates. The communication system includes the communication apparatus 101, communication apparatuses 102 and 103, and a wireless local area network (LAN) network 104 (hereinafter, network 104) in which the communication apparatuses 101, 102, and 103 participate. The communication apparatuses 101, 102, and 103 perform wireless communication on the network 104 that is an infrastructure network compliant with the Institute of Electrical and Electronics Engineers (IEEE) 802.11 series standard.

The network 104 is a network for performing time synchronization, formed by the communication apparatus 101 serving as an access point (AP). The communication apparatuses 102 and 103 participate in the network 104 as stations (STA). The communication apparatus 101 performs time synchronization with the communication apparatuses 102 and 103 participating in the network 104. The communication apparatus 101 operates as a master terminal that performs time synchronization with reference to time information of the communication apparatus 101 itself. The communication apparatuses 102 and 103 operate as slave terminals that synchronize with the time information about the communication apparatus 101. Aside from the network 104, the communication apparatus 101 can also establish a network intended for a different purpose than time synchronization. For example, if the communication apparatuses 101, 102, and 103 are cameras, the communication apparatus 101 can establish, aside from the network 104, a network intended to perform interlocked imaging in which the communication apparatuses 101, 102, and 103 share automatic shutter timing.

Specific examples of the communication apparatuses 101, 102, and 103 include, but not limited to, a camera, a tablet, a smartphone, a personal computer (PC), a mobile phone, and a video camera. The communication apparatuses 101, 102, and 103 may be any communication apparatuses capable of performing time synchronization. While the communication system illustrated in FIG. 1 includes three communication apparatuses, the communication system may include two communication apparatuses or four or more communication apparatuses.

In the present exemplary embodiment, the communication apparatuses 101, 102, and 103 illustrated in FIG. 1 perform wireless communication compliant with the IEEE 802.11 series standard. In addition, the communication apparatuses 101, 102, and 103 may use wireless communication compliant with other wireless communication methods, such as BLUETOOTH®, near field communication (NFC), Ultra Wide Band (UWB), ZIGBIE, and Multi Band OFDM (orthogonal frequency division multiplexing) Alliance (MBOA). UWB includes Wireless Universal Serial Bus (USB), Wireless 1394, and WiNET.

Figure 2:
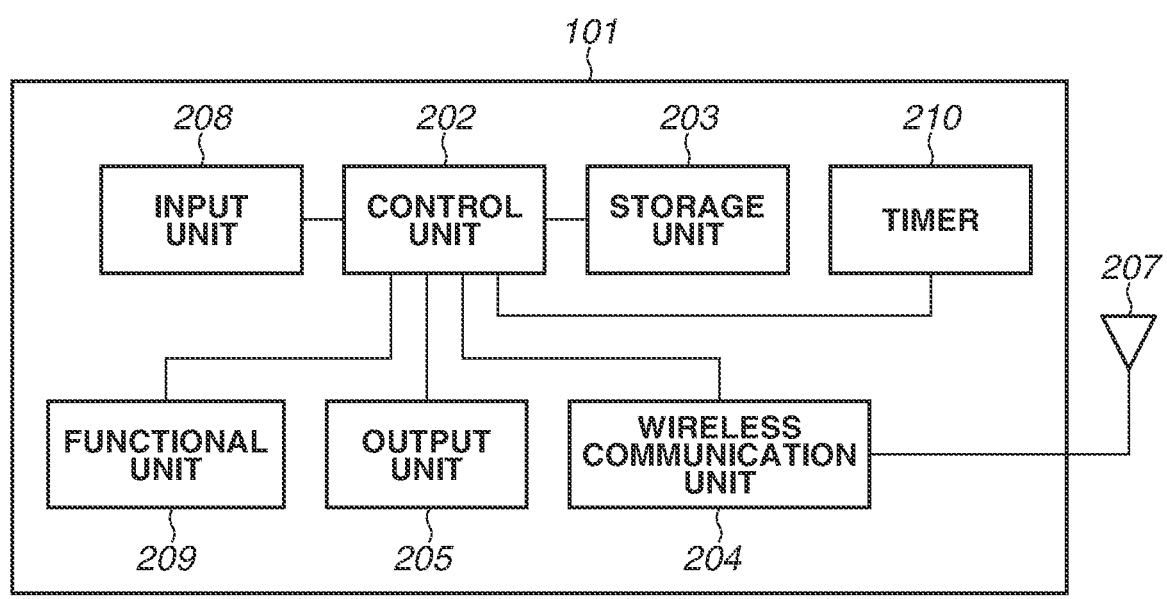
FIG. 2 is a diagram illustrating a hardware configuration of the communication apparatus 101.

FIG. 2 is a diagram illustrating a hardware configuration of the communication apparatus 101.

The communication apparatus 101 includes a storage unit 203, a control unit 202, a functional unit 209, an input unit 208, an output unit 205, a wireless communication unit 204, an antenna 207, and a timer 210.

The storage unit 203 includes one or more memories, such as a read-only memory (ROM) and a random access memory (RAM). The storage unit 203 stores computer programs for performing various operations (described below) and various types of information, such as communication parameters for wireless communication. Aside from memories such as a ROM and a RAM, storage media such as a flexible disk, a hard disk, an optical disc, a magneto-optical disc, a Compact Disc Read-Only Memory (CD-ROM), a Compact Disc Recordable (CD-R), a magnetic tape, a nonvolatile memory card, and a digital versatile disc (DVD) may be used as the storage unit 203. The storage unit 203 may include a plurality of memories.

The control unit 202 includes one or more processors, such as a central processing unit (CPU) and a microprocessing unit (MPU), which function(s) as a computer. The control unit 202 controls the entire communication apparatus 101 by executing the computer programs stored in the storage unit 203. The control unit 202 may control the entire communication apparatus 101 through cooperation of the computer programs stored in the storage unit 203 with an operating system (OS). The control unit 202 may include a plurality of processors like a multicore processor, and control the entire communication apparatus 101 by using the plurality of processors.

The communication apparatus 101 implements a time synchronization function as a master terminal by the control unit 202 executing a computer program stored in the storage unit 203. The time synchronization function as a master terminal refers to a function of performing time synchronization with other communication terminals serving as slave terminals with reference to the time information of the master terminal itself.

The control unit 202 controls the functional unit 209 to perform predetermined processing, such as imaging and content browsing. The functional unit 209 is hardware for the communication apparatus 101 to perform predetermined processing. For example, if the communication apparatus 101 is a camera, the functional unit 209 is an imaging unit and performs imaging processing.

The input unit 208 receives various operations from a user. The output unit 205 provides various types of output to the user via a monitor screen and/or a speaker. Examples of the output provided by the output unit 205 may include screen display, sound output from the speaker, and vibration output. The monitor screen to which the output unit 205 makes output is included in the communication apparatus 101. Alternatively, the monitor screen may be one included in another apparatus connected to the communication apparatus 101. Both the input unit 208 and the output unit 205 may be implemented by a single module like a touch panel. The output unit 205 implements a function as a notification unit for giving the user a notification by providing screen display, sound output from the speaker, and/or vibration output. The input unit 208 and the output unit 205 each may be a member integral with or separate from the communication apparatus 101. For example, the communication apparatus 101 may include, as the input unit 208, hardware keys and/or a touch screen integral with the communication apparatus 101, or include a remote controller separate from the communication apparatus 101. For example, the communication apparatus 101 may include, as the output unit 205, a monitor screen or a light source integral with the communication apparatus 101, or include a display and/or a speaker separate from the communication apparatus 101.

The wireless communication unit 204 performs wireless communication control compliant with the IEEE 802.11 series standard. The wireless communication unit 204 controls the antenna 207 to transmit and receive wireless signals for wireless communication. In addition to or instead of wireless communication compliant with the IEEE 802.11 series standard, the communication apparatus 101 may perform NFC based wireless communication and/or BLUETOOTH® based wireless communication. If the communication apparatus 101 can perform wireless communication compliant with a plurality of wireless communication standards, the communication apparatus 101 may separately include wireless communication units 204 and antennas 207 corresponding to the respective wireless communication standards.

The timer 210 is a clocking unit for measuring times used for various types of control and the time of a built-in clock. The timer 210 is managed by the control unit 202, and the measured times are stored in the storage unit 203. A time clocked by the timer 210 can be corrected by the control unit 202 as appropriate.

The communication apparatuses 102 and 103 have a similar hardware configuration to that of the communication apparatus 101. The control units 202 of the communication apparatuses 102 and 103 implement a time synchronization function as a slave terminal by executing a computer program stored in the storage units 203. The time synchronization function as a slave terminal is a function of performing time synchronization with reference to the time information of the master terminal (communication apparatus 101).

Figure 3:
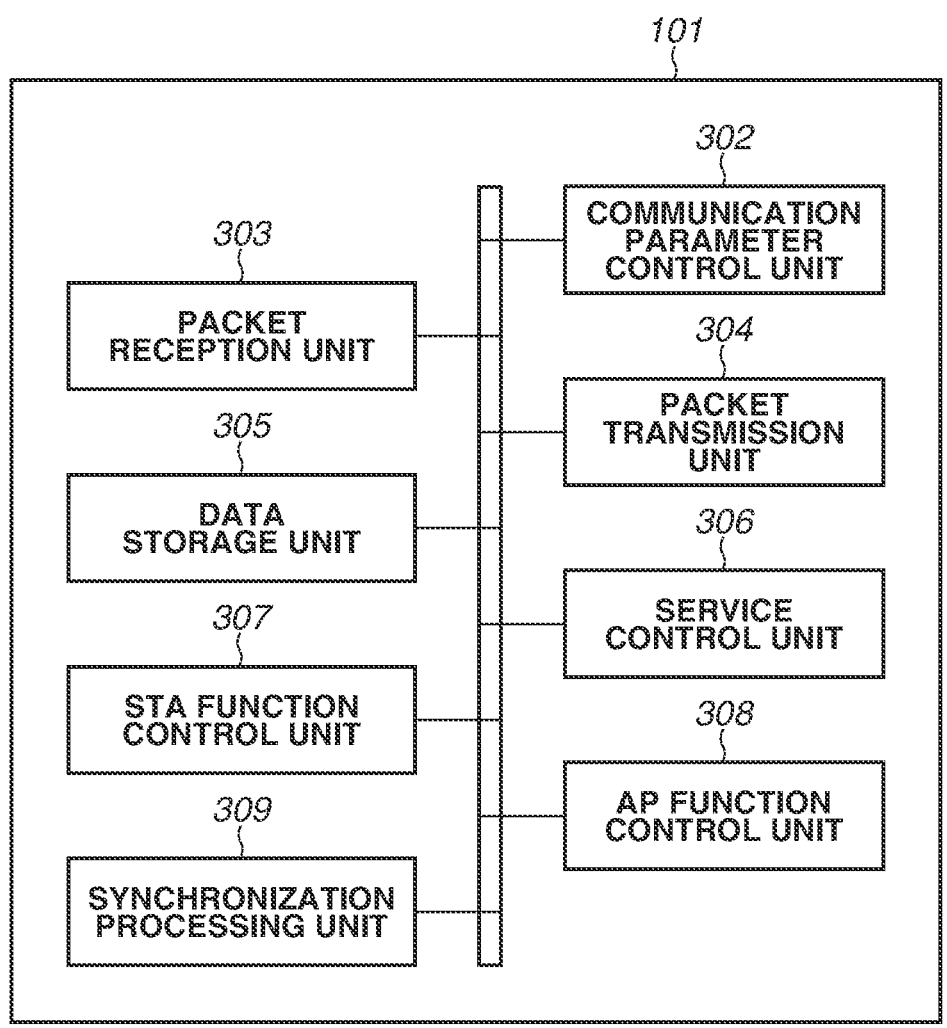
FIG. 3 is a diagram illustrating a functional configuration of the communication apparatus 101.

FIG. 3 is a diagram illustrating a functional configuration of the communication apparatus 101. The communication apparatuses 102 and 103 have a similar functional configuration to that of the communication apparatus 101.

A communication parameter control unit 302 performs communication parameter sharing processing for sharing communication parameters between communication apparatuses. A terminal for providing communication parameters (communication apparatus 101) provides communication parameters for connecting wirelessly to the network 104 to reception terminals (communication apparatuses 102 and 103). In the present exemplary embodiment, the communication apparatuses 101, 102, and 103 perform the communication parameter sharing processing through a method compliant with the WI-FI Device Provisioning Protocol (DPP) standard. Details of the communication parameter sharing processing will be described below with reference to FIG. 6.

The communication parameters include a Connector defined in the WI-FI DPP standard. In addition to or instead of the Connector, information such as a service set identifier (SSID) serving as a network identifier, an encryption method, an encryption key, an authentication method, an authentication key, a media access control (MAC) address, a pre-shared key (PSK), and a passphrase may be included as communication parameters. In addition to or instead of such information, the providing terminal may include an Internet Protocol (IP) address for performing commination on a network layer, information needed to use services on communication layers higher than the network layer, and a use purpose of the network as communication parameters.

In the present exemplary embodiment, the communication apparatuses 101, 102, and 103 are described to perform communication parameter sharing processing compliant with the WI-FI DPP standard. However, this is not restrictive, and the communication apparatuses 101, 102, and 103 may perform communication parameter sharing processing compliant with the WI-FI Protected Setup (WPS) standard or the WI-FI Direct standard.

In the present exemplary embodiment, the communication apparatuses 101, 102, and 103 are described to share the communication parameters of the network 104 through the communication parameter sharing processing. However, this is not restrictive. For example, communication parameters of a network intended for other than time synchronization, such as transmission and reception of imaging data, may be shared. The communication parameters of such networks may be shared through a single session of communication parameter sharing processing. Separate sessions of communication parameter sharing processing may be needed for the respective networks.

A packet reception unit 303 and a packet transmission unit 304 control transmission and reception of not only packets on a data link layer but all packets including those of communication protocols on upper communication layers including the network layer, a transport layer, and an application layer. In the present exemplary embodiment, the application layer refers to the fifth or higher layer of the Open Systems Interconnection (OSI) reference model (seven-layer model). The transport layer refers to the fourth layer of the OSI reference model. The network layer refers to the third layer of the OSI reference model. The data link layer refers to the second layer of the OSI reference model.

To transmit and receive packets compliant with the IEEE 802.11 series standard to/from a partner apparatus to perform wireless communication with, the packet reception unit 303 and the packet transmission unit 304 control the wireless communication unit 204. If the communication apparatus 101 is also capable of wireless communication compliant with other wireless communication standards, such as NFC and BLUETOOTH®, the packet reception unit 303 and the packet transmission unit 304 may control the wireless communication unit 204 to transmit and receive packets compliant with such communication standards. Alternatively, wireless communication units, packet reception units, and packet transmission units for respective different communication standards may be included.

A data storage unit 305 controls writing and reading of software, communication parameters, and authentication information to/from the storage unit 203.

A service control unit 306 is a control unit that controls services on the application layer. For example, the service control unit 306 transmits imaging data stored therein to another communication apparatus via wireless communication by the wireless communication unit 204.

An STA function control unit 307 provides an STA function for operating as an STA in an infrastructure mode compliant with the IEEE 802.11 series standard. A communication apparatus operating as an STA participates in a network established by a communication apparatus operating as an AP in the infrastructure mode, and performs wireless communication with other communication apparatuses. When joining a network established by an AP, the STA function control unit 307 performs authentication processing and encryption processing as an STA.

An AP function control unit 308 provides an AP function for operating as an AP in the infrastructure mode compliant with the IEEE 802.11 series standard. A communication apparatus operating as an AP establishes a network and performs wireless communication with other communication apparatuses participating in the network established by the communication apparatus operating as an AP. In a case where another communication apparatus joins, as an STA, the network established by the communication apparatus operating as an AP, the AP function control unit 308 performs authentication processing and encryption processing as an AP, and further manages STAs participating in the network. The AP function control unit 308 has a function of counting the number of STAs participating in the network established by the communication apparatus including the AP function control unit 308.

In the present exemplary embodiment, the communication apparatus 101 establishes the network 104 to be used for time synchronization. However, this is not restrictive. The communication apparatus 101 may establish a network to be used for other purposes, such as transmission and reception of imaging data aside, from the network 104.

In the present exemplary embodiment, the communication apparatuses 101, 102, and 103 each include both the STA function control unit 307 and the AP function control unit 308. However, this is not restrictive, and the communication apparatuses 101, 102, and 103 may each include either one of the function control units 307 and 308. Specifically, the communication apparatus 101 that establishes the network 104 may include only the AP function control unit 308. The communication apparatuses 102 and 103 that participate in the network 104 may include only the STA function control unit 307.

A synchronization processing unit 309 performs time synchronization processing between the master and slave terminals via the network 104. In the present exemplary embodiment, the time synchronization processing includes the slave terminals adjusting to the time of the master terminal with reference to the time information of the master terminal. Details of the time synchronization processing will be described with reference to FIGS. 7, 8, and 9.

In the present exemplary embodiment, the communication apparatuses 101, 102, and 103 perform the time synchronization processing with the communication apparatus 101 as a master terminal and the communication apparatuses 102 and 103 as slave terminals. The synchronization processing unit 309 of the communication apparatus 101 may therefore be a processing unit that can perform only the time synchronization processing as a master terminal. The synchronization processing units 309 of the communication apparatuses 102 and 103 may be processing units that can perform only the time synchronization processing as a slave terminal.

Figure 4:
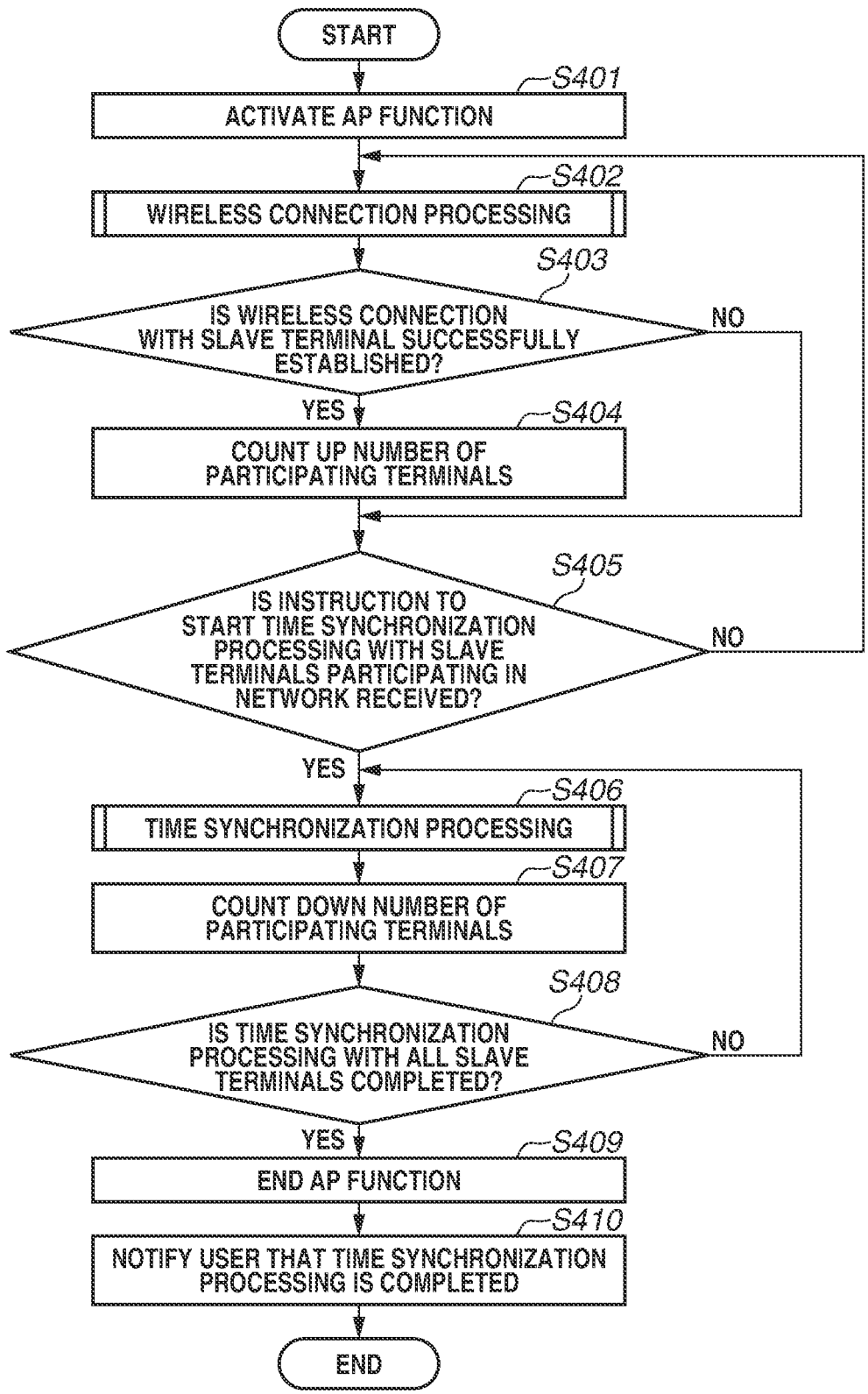
FIG. 4 is a flowchart illustrating an example of processing executed when the communication apparatus 101 performs time synchronization processing.

FIG. 4 is a flowchart illustrating an example of processing implemented by the control unit 202 executing a computer program stored in the storage unit 203 when the communication apparatus 101 according to the present exemplary embodiment performs the time synchronization processing.

The flowchart is started when the communication apparatus 101 is instructed to start the time synchronization processing as a master terminal by the user. Specifically, the flowchart is started in response to the pressing of a software key displayed on a touch panel that is the output unit 205 by the user. Alternatively, the flowchart may be started in response to the pressing of a hardware key provided on the communication apparatus 101. The communication apparatus 101 may be a communication apparatus that performs time synchronization processing each time a predetermining timing comes. In such a case, the communication apparatus 101 may start the processing of this flowchart when the predetermined timing comes.

In step S401, the communication apparatus 101 instructed to start the time synchronization processing as a master terminal activates the AP function in the infrastructure mode. More specifically, the communication apparatus 101 establishes the network 104. The communication apparatus 101 performs the time synchronization processing with the communication apparatuses 102 and 103 that join the network 104 through processing to be described below. In establishing the network 104, the communication apparatus 101 provides communication parameters for joining the network 104.

In step S402, after the activation of the AP function, the communication apparatus 101 performs wireless connection processing with a slave terminal. By performing the processing of this step, the communication apparatus 101 establishes the network 104 for time synchronization with the communication apparatuses 102 and 103. The communication apparatus 101 can establish wireless connection with only STAs intended for time synchronization. Details of this step will be described below with reference to FIG. 6.

In step S403, the communication apparatus 101 serving as a master terminal determines whether wireless connection with another communication apparatus serving as a slave terminal is successfully established. Specifically, the communication apparatus 101 determines whether the partner apparatus with which the wireless connection processing is performed in step S402 has joined the network 104. If the partner apparatus has joined the network 104, the communication apparatus 101 makes a determination of YES. If the partner apparatus has not joined the network 104, the communication apparatus 101 makes a determination of NO. If the determination in step S403 is NO (NO in step S403), the processing proceeds to step S405. If the determination in step S403 is YES (YES in step S403), the processing proceeds to step S404.

Figure 7:
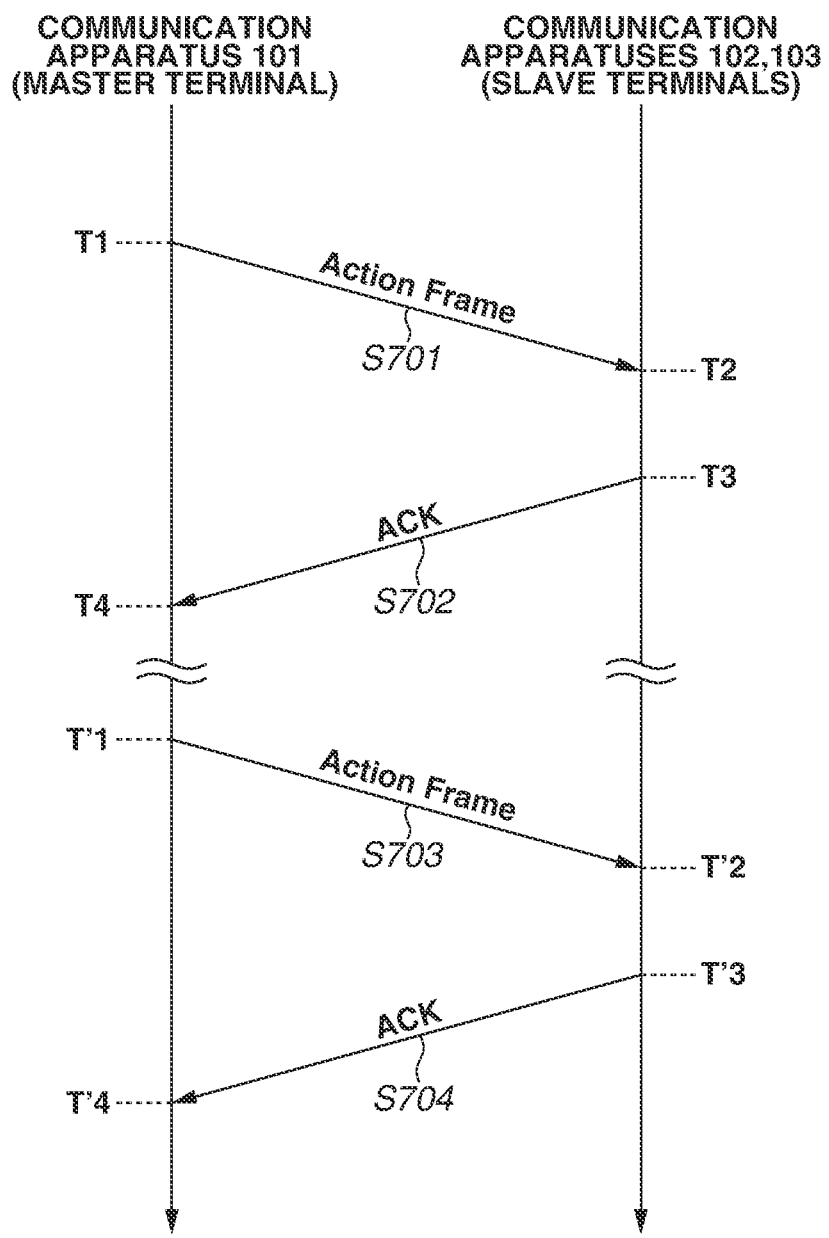
FIG. 7 is a sequence diagram illustrating processing executed when the communication apparatus 101 (master terminal) and the communication apparatuses 102 and 103 (slave terminals) perform the time synchronization processing.
Figure 8:
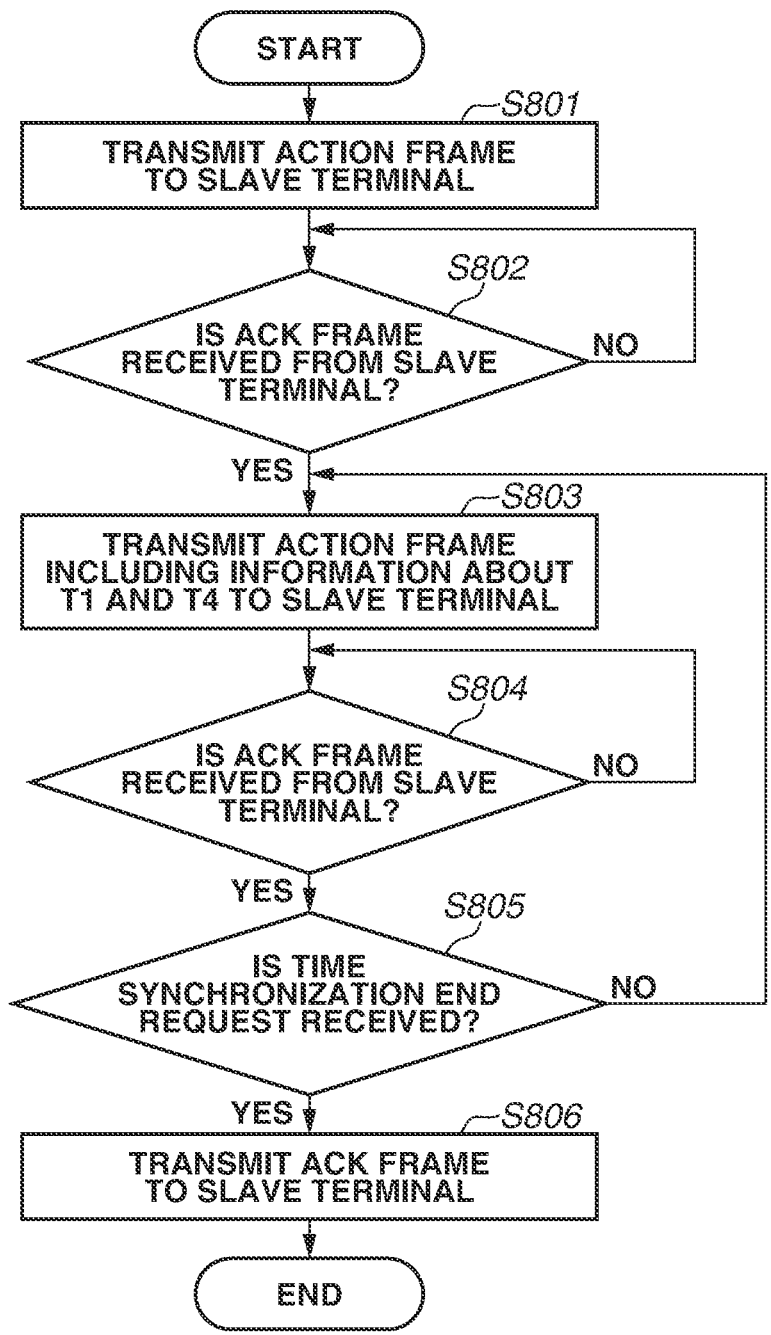
FIG. 8 is a flowchart illustrating an example of processing that the communication apparatus 101 (master terminal) executes in step S406 of FIG. 4.
Figure 9:
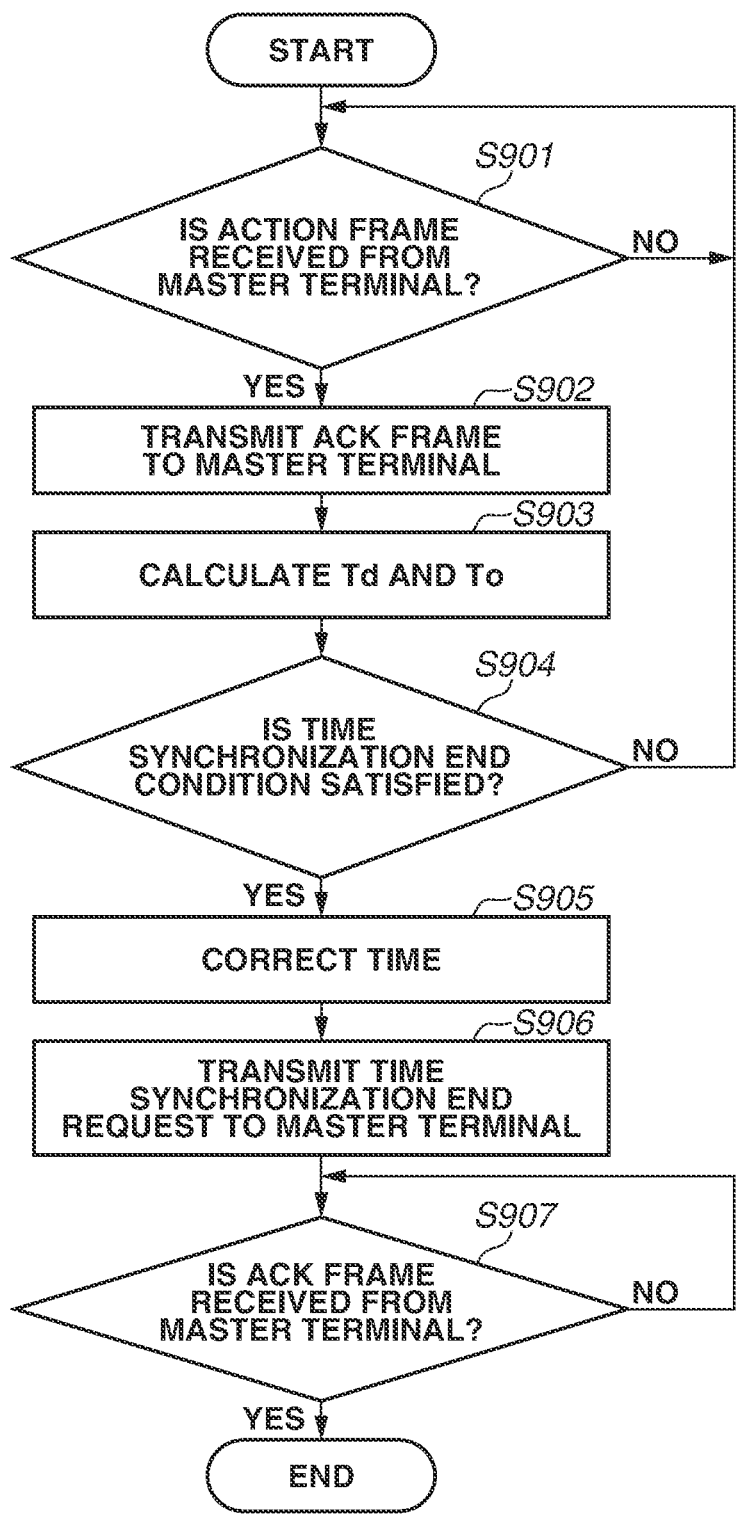
FIG. 9 is a flowchart illustrating an example of processing that the communication apparatuses 102 and 103 (slave terminals) execute in step S503 of FIG. 5.

In step S404, the communication apparatus 101 counts up the number of terminals participating in the network 104 established by the communication apparatus 101. Specifically, the communication apparatus 101 increases the value of a counter storing the number of terminals participating in the network 104 by one. At and after step S402, the communication apparatus 101 displays information about the number of terminals participating in the network 104 to the user via the output unit 205. Each time the communication apparatus 101 performs the process of step S402 and makes a determination of YES in step S403, the communication apparatus 101 counts up the displayed number of terminals by one. In step S404, the communication apparatus 101 stores the MAC address of the new slave terminal having just joined the network 104. The stored MAC address is used in exchanging action frames in the time synchronization processing to be described below (FIGS. 7, 8, and 9).

In step S405, the communication apparatus 101 determines whether a user operation for instructing the communication apparatus 101 to start the time synchronization processing with the slave terminals currently participating in the network 104 is received from the user. Specifically, if a software key displayed on the touch panel that is the output unit 205 is pressed by the user, the communication apparatus 101 makes a determination of YES. Alternatively, the communication apparatus 101 may make a determination of YES if a hardware key provided on the communication apparatus 101 is pressed. If the software key or hardware key is not pressed, the communication apparatus 101 makes a determination of NO. The communication apparatus 101 may make a determination of YES in this step not necessarily based on a user instruction and based on the participation of a predetermined number of slave terminals in the network 104. The communication apparatus 101 may make a determination of YES in this step if a predetermined time has elapsed since the reception of the instruction to start the time synchronization processing as a master terminal from the user in starting the present flowchart. The communication apparatus 101 may make a determination of YES in this step if a predetermined time has elapsed since a slave terminal joined the network 104 last time. If the determination in this step is NO (NO in step S405), the processing proceeds to step S402.

On the other hand, if the determination in step S405 is YES (YES in step S405), the processing proceeds to step S406. In step S406, the communication apparatus 101 performs the time synchronization processing with the slave terminals having joined the network 104 by step S405. In such a case, the communication apparatus 101 starts the time synchronization processing with all the slave terminals participating in the network 104 without receiving a selection instruction to select a slave terminal to perform the time synchronization processing with from the user. Specifically, the communication apparatus 101 identifies a slave terminal to perform the time synchronization processing with from a MAC address stored in step S404, and cause the identified slave terminal to execute the time synchronization processing. Details of this step will be described with reference to FIG. 8.

In step S407, having completed the time synchronization processing with the slave terminal, the communication apparatus 101 decreases the value of the counter storing the number of participating terminals counted in step S404 by one. Specifically, the master terminal reduces the value of the counter storing the number of participating terminals by one based on reception of a time synchronization completion notification from the slave terminal having completed the time synchronization processing. When reducing the value of the counter of the number of participating terminals by one in response to the completion of the time synchronization processing, the communication apparatus 101 may synchronously change the information about the number of participating terminals displayed via the output unit 205.

The information about the number of participating terminals may be the number of participating terminals itself, or information indicating the progress of the time synchronization processing in terms of the ratio of the number of terminals having completed the time synchronization processing based on the number of participating terminals at the point in time when the determination of YES is made in step S405. Such indication conveniently enables the user to visually observe the progress of the time synchronization processing.

In step S408, the communication apparatus 101 having performed the process of step S407 determines whether the time synchronization processing with all the slave terminals participating in the network 104 is completed. In this step, the communication apparatus 101 makes the determination depending on whether the value of the count storing the number of participating terminals is 0. If the value of the counter storing the number of participating terminals is 0, the communication apparatus 101 makes a determination of YES in this step (YES in step S408) and the processing proceeds to step S409. On the other hand, if the value of the counter storing the number of participating terminals is not 0, the communication apparatus 101 makes a determination of NO in this step (NO in step S408) and the processing proceeds to step S406.

In step S409, the communication apparatus 101 ends the AP function activated in step S401. The network 104 is thereby terminated, and the wireless connection between the master terminal and the slave terminals is disconnected.

In step S410, having ended the AP function, the communication apparatus 101 notifies the user via the output unit 205 that the time synchronization processing is completed. If the progress of the time synchronization processing has been displayed before step S410, the communication apparatus 101 may display that the progress of the time synchronization processing has reached 100%, instead of the notification in step S410. Alternatively, the communication apparatus 101 may display that the ratio of slave terminals not subjected to the time synchronization processing is 0%, instead of the notification in step S410. In the present exemplary embodiment, the communication apparatus 101 performs step S410 after step S409. However, this is not restrictive. The communication apparatus 101 may perform step S410 before step S409 or in parallel with step S409. With the process of step S410 performed by the communication apparatus 101, the processing of the present flowchart ends.

The processing that the communication apparatus 101 executes in performing the time synchronization processing has been described above with reference to FIG. 4.

Figure 5:
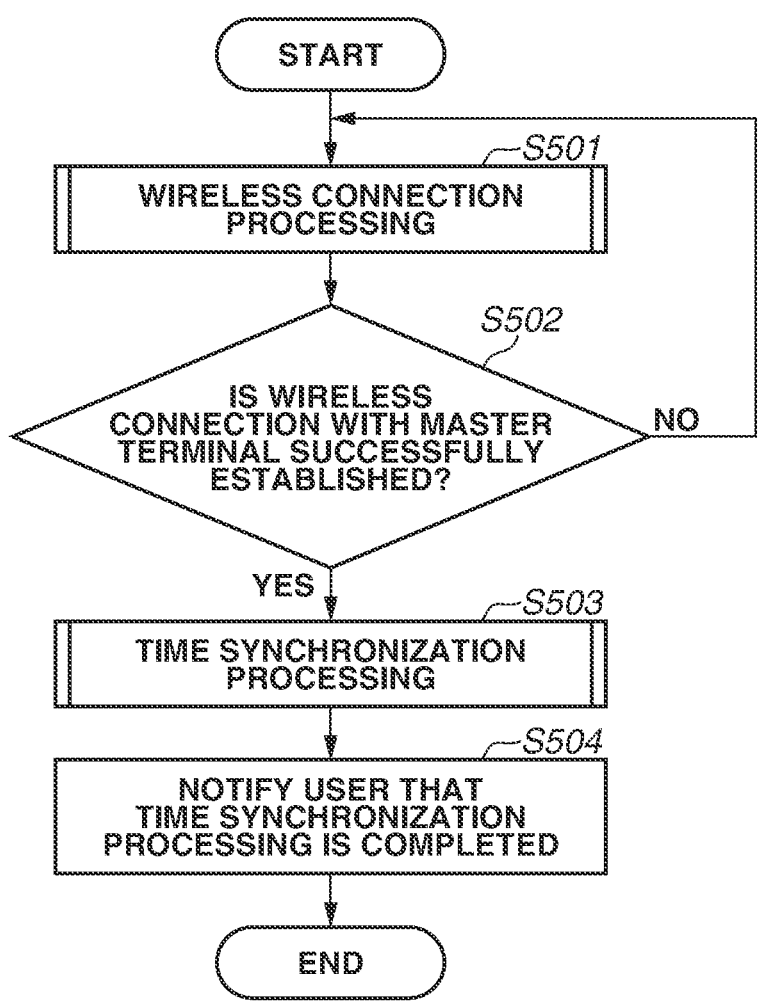
FIG. 5 is a flowchart illustrating an example of processing executed when communication apparatuses 102 and 103 perform the time synchronization processing.

FIG. 5 is a flowchart illustrating an example of processing implemented by the control unit 202 executing a computer program stored in the storage unit 203 when the communication apparatuses 102 and 103 according to the present exemplary embodiment perform the time synchronization processing. FIG. 5 will herein be described by using the communication apparatus 102 as an example.

The present flowchart is started when the communication apparatus 102 is instructed to start the time synchronization processing as a slave terminal by the user. Specifically, the flowchart is started in response to the pressing of a software key displayed on a touch panel that is the output unit 205 by the user. Alternatively, the flowchart may be started in response to the pressing of a hardware key provided on the communication apparatus 102. The communication apparatus 102 may be one that performs time synchronization processing each time a predetermined timing comes. In such a case, the communication apparatus 102 may start the processing of this flowchart when the predetermined timing comes.

In step S501, the communication apparatus 102 instructed to start the time synchronization processing as a slave terminal executes the STA function in the infrastructure mode, and performs wireless connection processing with the communication apparatus 101 that is the master terminal. By performing the process of this step, the communication apparatus 102 joins the network 104 established by the communication apparatus 101 and establishes wireless connection with the communication apparatus 101. Details of this step will be described below with reference to FIG. 6.

In step S502, the communication apparatus 102 determines whether wireless connection with the communication apparatus 101 that is the master terminal is successfully established. Specifically, the communication apparatus 102 determines whether the communication apparatus 102 itself has joined the network 104 established by the communication apparatus 101 with which the wireless connection processing is performed in step S501. If it is determined that the communication apparatus 102 has joined the network 104, the communication apparatus 102 makes a determination of YES in this step. If it is determined that the communication apparatus 102 has failed to join the network 104, the communication apparatus 102 makes a determination of NO. If the determination in step S502 is NO (NO in step S502), the processing proceeds to step S501.

If the communication apparatus 102 has successfully established the wireless connection with the communication apparatus 101 that is the master terminal (YES in step S502), the processing proceeds to step S503. In step S503, the communication apparatus 102 performs the time synchronization processing with the communication apparatus 101. Details of this step will be described with reference to FIG. 9.

In step S504, the communication apparatus 102 notifies the user via the output unit 205 that the time synchronization processing with the master terminal is completed. The processing of the present flowchart ends.

The processing that the communication apparatuses 102 and 103 execute in performing the time synchronization processing has been described above with reference to FIG. 5.

Figure 6:
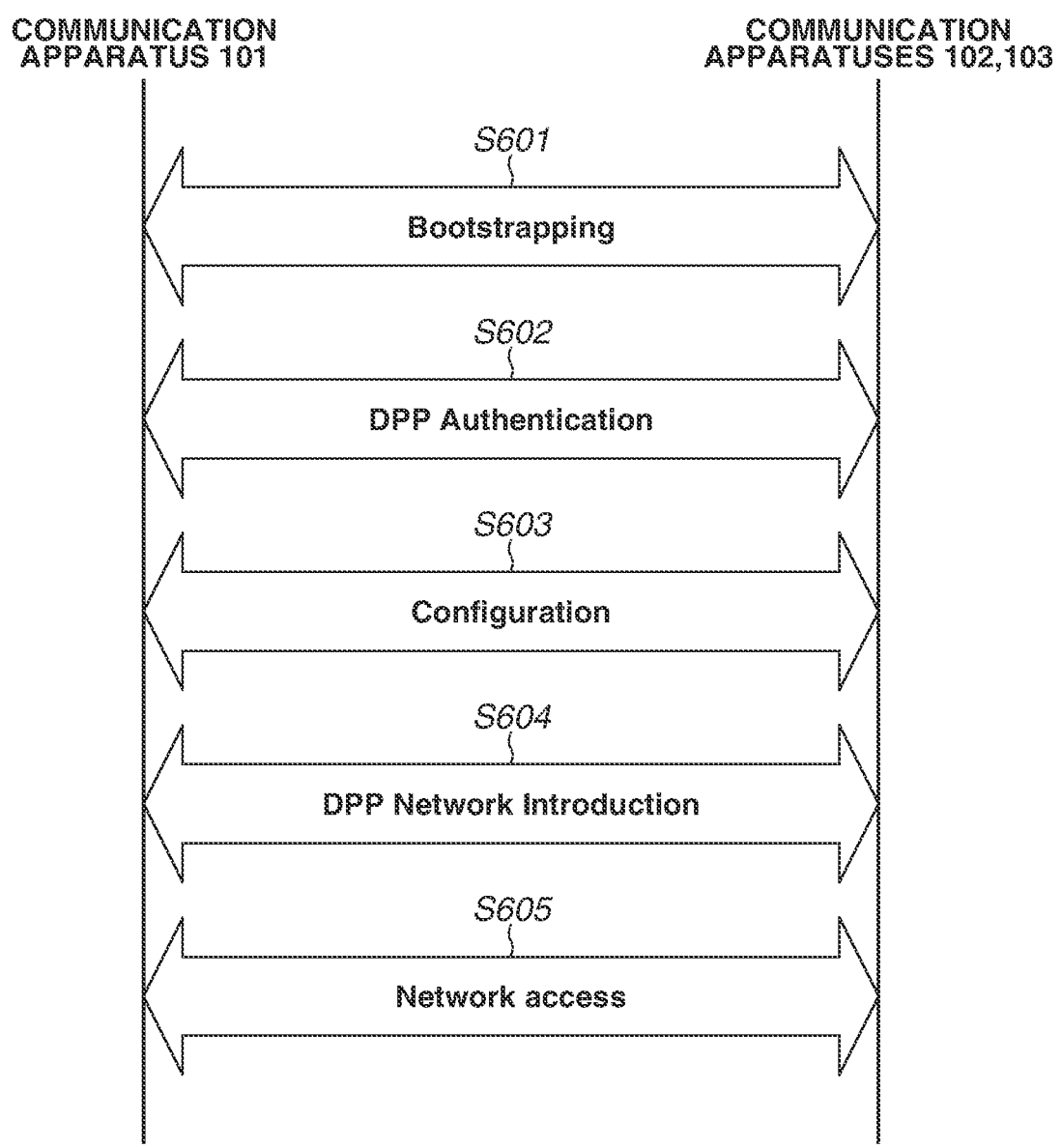
FIG. 6 is a sequence diagram illustrating processing executed when the communication apparatus 101 and the communication apparatuses 102 and 103 share communication parameters and establish a wireless connection.

FIG. 6 is a sequence diagram illustrating processing executed when the communication apparatus 101 and the communication apparatuses 102 and 103 share communication parameters and establish wireless connection. The communication apparatus 101 executes the processing illustrated in the present sequence diagram in step S402 of FIG. 4, and the communication apparatuses 102 and 103 in step S501 of FIG. 5.

In the present exemplary embodiment, the communication apparatus 101 performs communication parameter sharing processing compliant with the WI-FI DPP standard with the communication apparatuses 102 and 103. In the present exemplary embodiment, the communication apparatus 101 operates as a configurator, and the communication apparatuses 102 and 103 as enrollees. The configurator has the role of providing communication parameters to the enrollees. The enrollees have the role of receiving the communication parameters provided by the configurator. By using the communication parameters provided by the configurator, a communication apparatus operating as an enrollee can join a network that uses the communication parameters.

The communication parameter sharing processing compliant with the WI-FI DPP standard and the establishment of wireless connection are broadly classified into four steps. Specifically, the communication parameter sharing processing and the establishment of wireless connection include bootstrapping (step S601), authentication (step S602), configuration (step S603), and network introduction (step S604). The communication apparatus 101 and the communication apparatuses 102 and 103 further perform the process of step S605 to establish wireless connection. Each step will be described below.

In step S601 (bootstrapping), the configurator and the enrollees share a public key (bootstrapping key) to be used in performing the authentication (step S602). The public key is information used to enhance security during the communication parameter sharing processing. Information such as a certificate and a password may be used as the public key. A public key is a type of encryption key used in public key cryptography. The configurator and the enrollees may also share information such as channel information and MAC addresses for performing the authentication aside from the public key. Examples of the method for the bootstrapping (step S601) include a method using a public key exchange (PKEX) protocol, one using BLUETOOTH®, one using NFC, and one using QUICK RESPONSE (QR) code (registered trademark). Each method will be described below. In performing the bootstrapping and the authentication, the configurator and the enrollees are each given the role of an initiator or responder. The present exemplary embodiment will be described by using an example where the configurator operates as a responder and the enrollees as initiators. However, the configurator may operate as an initiator and the enrollees as responders.

The bootstrapping using the PKEX protocol will initially be described. If the PKEX protocol is used, an initiator and a responder use a common code to share a bootstrapping key with the partner apparatuses. A code includes characters, numerals, symbols, or a combination of these. In the present exemplary embodiment, the communication apparatuses 101, 102, and 103 use a time synchronization code corresponding to the network 104 for performing time synchronization (for example, "time-synchronization") in the bootstrapping. The time synchronization code may be stored in the communication apparatuses or optionally input by the user.

When starting time synchronization, the communication apparatuses 101, 102, and 103 set the time synchronization code stored in the own apparatuses for bootstrapping use. A common code is thereby set in the communication apparatuses 101, 102, and 103. Alternatively, the user may set a common code by inputting a time synchronization code that the communication apparatus 101 displays in starting time synchronization into the communication apparatuses 102 and 103. In such a case, the communication apparatus 101 may have stored the time synchronization code or generate the time synchronization code. The apparatus to display the time synchronization code may be the communication apparatus 102 or 103 instated of the communication apparatus 101. Yet alternatively, the user may input an optional common code into the communication apparatuses 101, 102, and 103 so that the common code is set in each of the communication apparatuses 101, 102, and 103.

The initiator initially generates an encryption element Qi by hashing the time synchronization code (code) and the MAC address of the own apparatus (MAC-Initiator):

$$Qi=H(\text{MAC-Initiator}|code)*Pi.$$

The initiator also generates a temporary key pair (x/X), where $X=x*G$, and generates an information element M by adding X to the generated encryption element Qi:

$$M=X+Qi,$$

where X is a public key, and x is a secret key corresponding to the public key X. The public key X and the information element M are vectors each including an x component and a y component.

The initiator transmits a PKEX Exchange Request frame including the generated information element M to the responder.

If the MAC address of the responder is known to the initiator in advance, the initiator unicasts the PKEX Exchange Request frame to the responder. If the MAC address of the responder is not yet known, the initiator broadcasts the PKEX Exchange Request frame.

The responder calculates the temporary key (public key) X of the initiator from the information element M received. The temporary key X of the initiator, calculated by the responder will be denoted by X'.

The responder hashes the time synchronization code and the MAC address of the initiator to generate an encryption element Qi':

$$Qi'=H(\text{MAC-Initiator}|code)*Pi.$$

The responder then calculates the temporary key X' from the generated encryption element Qi' and the information element M received from the initiator:

$$X'=M-Qi'.$$

In addition to such processing, the responder also generates a temporary key pair (y/Y), where $Y=y*G$, like the initiator. Y is a public key, and y is a secret key corresponding to the public key Y. The responder hashes the time synchronization code and the MAC address of the own apparatus (MAC-Responder) to generate an encryption element Qr:

$$Qr=H(\text{MAC-Responder}|code)*Pi.$$

The responder generates an information element N by adding the temporary key Y to the generated encryption element Qr:

$$N=Y+Qr.$$

The public key Y and the information element N are vectors each including an x component and a y component.

The responder transmits a PKEX Exchange Response frame including the information element N to the initiator. The PKEX Exchange Response frame is a response to the PKEX Exchange Request frame.

The responder further calculates a secret element K from the secret key y of the own apparatus and the calculated temporary key X':

$$K=y*X'.$$

The responder generates a common encryption key Z with the initiator by using the MAC addresses of the initiator and the responder, the information elements M and N, the time synchronization code, and the secret element K:

$$Z=\text{HKDF}(<>,\text{MAC-Initiator}|\text{MAC-Responder}|M\cdot x|N\cdot x|code,K\cdot x).$$

Here, < > indicates that the first argument to be passed to the function is blank. | represents a combination of the elements. M·x, N·x, and K·x are the values of the x components of M, N, and K, respectively.

Meanwhile, the initiator having received the information element N from the responder similarly generates the common encryption key Z by calculating the temporary key Y of the responder (Y') and generating the secret element K.

The initiator generates an encryption element Qr' from the time synchronization code and the MAC address of the responder:

$$Qr'=H(\text{MAC-Responder}|code)*Pi.$$

The initiator generates the temporary key Y of the responder from the received information element N and the generated encryption element Qr':

$$Y'=M-Qr'.$$

The initiator calculates the secret element K from the calculated temporary key Y' and the secret key x:

$$K=x*Y'.$$

The initiator generates the common encryption key Z with the responder by using the MAC addresses of the initiator and the responder, the information elements M and N, the time synchronization code, and the secret element K:

$$Z=\text{HKDF}(<\ >,\text{MAC-Initiator}|\text{MAC-Responder}|M\cdot x|N\cdot x|code,K\cdot x).$$

In such a manner, the initiator and the responder generate the common encryption key Z by using the same time synchronization code.

The responder and the initiator each having generated the common encryption key Z then share a bootstrapping key.

The initiator initially generates an information element J by using the calculated temporary key Y' of the responder and a secret key a corresponding to a bootstrapping key A of the own apparatus:

$$J=a*Y'.$$

The initiator then calculates an encryption element u by using the calculated information element J, the MAC address of the own apparatus, the bootstrapping key A, the temporary key Y' of the responder, and the temporary key X of the own apparatus:

$$u=\text{HMAC}(J\cdot x,\text{MAC-Initiator}|A\cdot x|Y'\cdot x|X\cdot x).$$

The initiator encrypts the calculated encryption element u and bootstrapping-related information including the bootstrapping key A by using the common encryption key Z. The initiator transmits a PKEX Confirmation Request frame including the encryption result to the responder.

In response to receiving the encrypted encryption element u and bootstrapping key A, the responder decrypts the encrypted encryption element u and bootstrapping key A. The responder then calculates an information element J' by using the decrypted bootstrapping key A' of the initiator:

$$J'=y*A'.$$

The responder further calculates an encryption element u' by using the calculated information element J', the MAC address of the initiator, the decrypted bootstrapping key A', the temporary key Y of the own apparatus, and the temporary key X' of the initiator:

$$u'=\text{HMAC}(J'\cdot x,\text{MAC-Initiator}|A'\cdot x|Y\cdot x|X'\cdot x).$$

The responder determines whether the calculated encryption element u' and the encryption element u received from the initiator coincide. If it is determined that the encryption keys u' and u coincide, the responder authenticates the decrypted bootstrapping key A' as the bootstrapping key of the initiator. The responder uses the authenticated bootstrapping key A' in the processing at and after step S602.

In a similar manner, a bootstrapping key B of the responder is transmitted to the initiator. The responder initially generates an information element L by using the calculated temporary key X' of the initiator and a secret key b corresponding to the bootstrapping key B of the own apparatus:

$$L=b*X'.$$

The responder then calculates an encryption element v by using the calculated information element L, the MAC address of the own apparatus, the bootstrapping key B, the temporary key X' of the initiator, and the temporary key Y of the own apparatus:

$$v=\text{HMAC}(L\cdot x,\text{MAC-Responder}|B\cdot x|X'\cdot x|Y\cdot x).$$

The responder encrypts the calculated encryption element v and bootstrapping-related information including the bootstrapping key B by using the common encryption key Z. The responder transmits a PKEX Confirmation Response frame including the encryption result to the initiator.

In response to receiving the encrypted encryption element v and bootstrapping key B, the initiator decrypts the encrypted encryption element v and bootstrapping key B. The Initiator then calculates an information element L' by using the decrypted bootstrapping key B' of the responder:

$$L'=x*B'.$$

The initiator further calculates an encryption element v' by using the calculated information element L', the MAC address of the responder, the decrypted bootstrapping key B', the temporary key X of the own apparatus, and the temporary key Y' of the responder:

$$v'=\text{HMAC}(L'\cdot x,\text{MAC-Responder}|B'\cdot x|X\cdot x|Y'\cdot x).$$

The initiator determines whether the calculated encryption element v' and the encryption element v received from the responder coincide. If it is determined that the encryption elements v' and v coincide, the initiator authenticates the decrypted bootstrapping key B' as the bootstrapping key of the responder. The initiator uses the authenticated bootstrapping key B' in the processing at and after step S602.

If the initiator and the responder use different codes for bootstrapping, the initiator and the responder are unable to decrypt the encrypted bootstrapping keys received from the partner apparatuses. Otherwise, the encryption element (u' or v') calculated by an own apparatus does not coincide with the encryption element (u or v) received from the partner apparatus. In such cases, the initiator or responder determines that the bootstrapping has failed, ends the bootstrapping processing, and transmits information indicating an error to the partner apparatus. If the bootstrapping has failed, the initiator and the responder therefore end the processing FIGS. 4 and 5 since the processing at and after step S602 is unable to be performed. If the bootstrapping has failed, the initiator and the responder may notify the user of the failure by displaying information indicating an error or the failure of the bootstrapping on the display units of the own apparatuses.

In the present exemplary embodiment, to perform time synchronization, the communication apparatuses 101, 102, and 103 perform the bootstrapping by using the time synchronization code. In addition, the communication apparatuses 101, 102, and 103 can perform bootstrapping using a code corresponding to a network intended for a different purpose such as interlocked imaging (e.g., a character string "interlocking-shutter"). By using the time synchronization code and other codes in this way, communication apparatuses not intended for time synchronization can be prevented from joining the network 104.

Next, bootstrapping using BLUETOOTH® will be described. In the present exemplary embodiment, BLUETOOTH® includes BLUETOOTH® Low Energy according to BLUETOOTH® 4.0 or later. The configurator operating as a responder initially enters a bootstrapping mode, and advertises information about a secondary channel to be used in transmitting an advertisement packet including bootstrapping-related information. The advertisement packet including bootstrapping-related information refers to an AUX_ADV_IND packet. The responder advertises the information about the secondary channel by using an ADV_ENT_IND packet over a primary channel different from the secondary channel. An initiator receives the advertisement packet (ADV_EXT_IND) from the responder through the primary channel. The initiator waits for an advertisement packet from the responder on the secondary channel obtained from the received advertisement packet (ADV_EXT_IND). The responder transmits the advertisement packet (AUX_ADV_IND) including the bootstrapping-related information over the secondary channel. The initiator obtains the bootstrapping-related information including a bootstrapping key by receiving the advertisement packet from the enrollee through the secondary channel, and completes the bootstrapping.

When receiving ADV_EXT_IND packets on the primary channel, the initiator can display information about the responders supporting the bootstrapping using BLUETOOTH® to the user. This enables the user to select a responder to perform the bootstrapping with. If the AUX_ADV_IND packet has been successfully received from the user-selected responder through the secondary channel, the initiator completes the bootstrapping since the bootstrapping-related information has been successfully obtained. If the AUX_ADV_IND packet has failed to be received, the initiator transmits an AUX_SCAN_REQ packet to the user-selected responder to request the bootstrapping-related information. The responder having received the AUX_SCAN_REQ packet completes the bootstrapping by transmitting an AUX_SCAN_RSP packet including the bootstrapping-related information to the initiator.

Next, bootstrapping using NFC will be described. Among NFC methods is one called NFC handover, in which information for performing communication by a communication method different from NFC (for example, WI-FI, BLUETOOTH®, and IP communication) is shared via NFC. The bootstrapping using NFC utilizes such an NFC handover method. There are two types of NFC handover methods, including negotiated handover and static handover. Bootstrapping by using each method will be described below.

In the case of negotiated handover, if an enrollee serving as an initiator and a configurator serving as a responder approach each other, which apparatus serves as an NFC handover requester is determined. An NFC handover requester has the role of initiating an NFC handover by transmitting a handover request message. Either one of the communication apparatuses serves as an NFC handover requester, and the other an NFC handover selector. Either the initiator or the responder may be the NFC handover requester. The NFC handover requester transmits a handover request message including bootstrapping-related information about the NFC handover requester to the NFC handover selector. The NFC handover selector having received the handover request message transmits a handover select message including bootstrapping-related information about the NFC handover selector as a response. If the NFC handover requester and selector have exchanged the bootstrapping-related information by exchanging the messages, the NFC handover requester and selector complete the bootstrapping. The bootstrapping-related information may be included in either one of the handover request message and the handover select message.

In the case of static handover, if an enrollee serving as an initiator and a configurator serving as a responder approach each other, the initiator reads the bootstrapping-related information about the responder from the responder by NFC communication. The bootstrapping is thereby completed.

If the bootstrapping is performed by using BLUETOOTH® or NFC, each communication apparatus may include information indicating the purpose of the wireless connection in any of the frames the own apparatus transmits. Specifically, each communication apparatus may include a code indicating the purpose of the wireless connection in any of the frames the own apparatus transmits. In the present exemplary embodiment, the communication apparatuses 101, 102, and 103 establish a wireless connection via the network 104 for the purpose of time synchronization. Thus, the communication apparatuses 101, 102, and 103 may transmit a frame including a code corresponding to the time synchronization processing, such as "time-synchronization". A communication apparatus having received the frame determines whether the code included in the frame coincides with the code corresponding to the time synchronization processing, stored in the own apparatus. If it is determined that the codes coincide, the communication apparatus performs the communication parameter sharing processing. The communication apparatus having received the frame can prevent a communication apparatus intended for a different purpose from joining the network 104 by ending, as an error, the communication parameter sharing processing with another communication apparatus transmitting a frame not including the code corresponding to the time synchronization processing.

Finally, bootstrapping using a QR code will be described. An initiator or responder reads a QR code including bootstrapping-related information about the partner apparatus, thereby completing the bootstrapping. The QR code may be displayed via a screen that is the output unit 205 included in the communication apparatus, or may be attached to the communication apparatus main body. If the partner apparatus has a printing function, the partner apparatus may print a QR code including the bootstrapping-related information about the communication apparatus, and the communication apparatus may read the printed QR code.

In the present exemplary embodiment, a communication apparatus displaying a QR code may include information indicating the purpose of the wireless connection into the QR code to be displayed. Specifically, the communication apparatus which displays the QR code may include a code indicating the purpose of the wireless connection into the QR code to be displayed. In the present exemplary embodiment, the communication apparatuses 101, 102, and 103 perform wireless communication via the network 104 for the purpose of time synchronization. A communication apparatus having captured the QR code determines whether the code included in the QR code coincides with the code corresponding to the time synchronization processing, stored in the communication apparatus. If it is determined that the codes coincide, the communication apparatus performs the communication parameter sharing processing. If the code corresponding to the time synchronization processing is not included in the captured QR code, the communication apparatus having captured the QR code does not perform the communication parameter sharing processing with that communication apparatus. This can prevent communication apparatuses intended for a different purpose from joining the network 104.

Specifically, the bootstrapping-related information communicated by any of the foregoing methods is a public key used for the authentication (bootstrapping key). Channel information for performing the authentication and information such as the MAC address of the enrollee may be included aside from the public key.

After the bootstrapping (step S601) is performed through any one of the foregoing methods and the bootstrapping key is shared, the communication apparatuses 101, 102, and 103 perform the authentication (step S602).

In step S602 (authentication), the communication apparatuses 101, 102, and 103 perform authentication processing for performing the communication parameter sharing processing. The authentication processing uses the public key obtained by the bootstrapping (step S601). The configurator and the enrollees can obtain a common key by performing the authentication (step S602). The common key is used to encrypt communication during the configuration (step S603).

The authentication (step S602) uses an authentication method using the bootstrapping key shared by the bootstrapping (step S601). Specifically, each terminal calculates the hash value of the shared bootstrapping key, and determines whether a hash value transmitted from the partner apparatus coincides with the hash value calculated by the own apparatus. If the hash values coincide, authentication succeeds. If not, authentication fails. The authentication (step S602) is performed by exchanging authentication request, authentication response, and authentication confirmation frames.

An initiator initially transmits an authentication request frame. The authentication request frame is a DPP authentication request frame defined in the WI-FI DPP standard. If the bootstrapping-related information shared by the bootstrapping includes channel information, the initiator transmits the authentication request frame over the channel indicated by the channel information. The responder similarly waits for an authentication request frame on the channel indicated by the channel information. If the bootstrapping-related information includes the MAC address of the responder, the initiator may unicast the authentication request frame to the responder by using the MAC address. The authentication request frame includes authentication information, identification information, role information, a random number, and a public key for shared key generation. The authentication information refers to the hash value of the bootstrapping key of the responder, obtained by the bootstrapping (step S601). The identification information refers to the hash value of the bootstrapping key of the initiator. The role information indicates whether the initiator operates as a configurator or an enrollee, or both. The random number is used for authentication that is performed when an authentication response frame to be described below is received. The public key for shared key generation is a key from which a shared key is generated with the responder to be authenticated.

The initiator generates a shared key by using a public key for shared key generation received from the responder and its own secret key for shared key generation. The responder generates a shared key by using both the public key for shared key generation received from the initiator and its own secret key for shared key generation. Here, the shared keys are generated based on an elliptic curved Diffie-Hellman (ECDH) method. Hereinafter, shared keys are assumed to be generated based on the ECDH method. However, the method for generating a shared key is not limited thereto. Other public key encryption methods may be used to generate a shared key.

Having received the authentication request frame from the initiator, the responder checks whether the initiator that has transmitted the authentication request frame is the partner apparatus to which the bootstrapping-related information has been transmitted in the bootstrapping (step S601). Specifically, the responder checks whether the hash value of the bootstrapping key of the own apparatus coincides with the authentication information included in the received authentication request frame. If the two hash values coincide, the responder determines that authentication is successful. There shall be a consensus between the responder and the initiator in advance about the hash function to be used in calculating the hash values.

The responder here refers to the role information about the initiator, included in the authentication request frame, and determines the role of the own apparatus. For example, if the initiator is an enrollee, the responder becomes a configurator. The information about the determined role is included into an authentication response frame to be described below and transmitted to the initiator.

If authentication is successful, the responder transmits an authentication response frame to the initiator. The authentication response frame is a DPP authentication response frame defined in the WI-FI DPP standard. The authentication response frame includes the responder's public key for shared key generation, role information, a random number, and tag information. The responder's public key for shared key generation is a key from which a shared key for encrypting communication parameters is generated. The tag information is the random number included in the authentication request frame. The tag information is encrypted with a shared key generated by both the responder's secret key for shared key generation and the initiator's public key for shared key generation. If the responder has the bootstrapping key of the initiator, the hash value thereof may be included in the authentication response frame for mutual authentication.

Next, the initiator having received the authentication response frame checks whether the tag information included in the authentication response frame can be correctly decrypted with the shared key generated by the initiator. Specifically, the initiator generates a shared key by using the responder's public key for shared key generation and the initiator's secret key for shared key generation, and restores the tag information by using the shared key. If the tag information can be decrypted, the initiator determines that authentication is successful, and transmits an authentication confirmation frame to the responder. The initiator may determine the role of the own apparatus by checking the role information about the responder, included in the authentication response frame. An example of the authentication confirmation frame is a DPP authentication confirm frame defined in the WI-FI DPP standard. The authentication confirmation frame includes tag information. The tag information is the random number included in the authentication response frame received from the responder, encrypted with the shared key generated by the initiator.

Having received the authentication confirmation frame, the responder checks whether the tag information can be decrypted by using the shared key generated by the responder. If the tag information can be decrypted, the responder determines that authentication is successful.

By performing the authentication (step S602) as described above, the communication apparatus 101 and the communication apparatuses 102 and 103 can perform authentication processing and determine the roles of the configurator and enrollees.

After the completion of the authentication (step S602), the configuration (step S603) is performed. The configuration includes sharing the communication parameters for establishing wireless connection. In the configuration, the enrollees request the communication parameters and the configurator provides the communication parameters regardless of which apparatus has been an initiator and which apparatus has been a responder.

In the case of using DPP, the communication parameters include an authentication and key management type (AKM), a legacy PSK/passphrase, a Connector, an Expiry (expiration date), and s C-sign-key (public key), which are included in an entire structure called DPP Credential. The AKM is a value indicating which authentication protocol and key exchange algorithm are used during communication. The legacy PSK/passphrase is an encryption key for performing authentication and key exchange based on a conventional WI-FI Protected Access (WPA) or the IEEE 802.11 series standard. The legacy PSK/passphrase may be information for connecting to an AP not supporting DPP, and does not need to be included as a communication parameter. The Connector includes various types of information to be used by an authentication protocol and key exchange algorithm defined in DPP. The Connector is information for connecting to a DPP-capable AP and joining a network. In the present exemplary embodiment, the Connector is information for joining the network 104 established by the communication apparatus 101. The C-sign-key is a public key dedicated to the configurator. The Connector is encrypted with a secret key dedicated to the configurator.

In the present exemplary embodiment, the communication apparatuses 101, 102, and 103 establish a wireless connection via the network 104 for the purpose of time synchronization. The configurator therefore provides a Connector for the network 104 (for time synchronization). However, this is not restrictive. For example, if the communication apparatuses 101, 102, and 103 establish a wireless connection via a network for the purpose of data communication, the configurator may provide a Connector different from that for time synchronization. If PKEX is used in the bootstrapping, the configurator may determine the Connector to be provided based on the used code. If the bootstrapping is performed by using other methods, the configurator may determine the Connector to be provided based on information indicating the purpose of the network.

The configuration (step S603) is performed by exchanging setting request and setting response frames. Only the enrollees can start the configuration (i.e., transmit a setting request frame).

An example of the setting request frame is a DPP configuration request frame defined in the WI-FI DPP standard. The setting request frame is transmitted from an enrollee to the configurator. The setting request frame includes device information and role information. The device information includes a device name thereof. The role information is information indicating the role that the enrollee intends to play in the network that the enrollee can join by using the received communication parameters. Specifically, the role information is information indicating whether the role as an AP for establishing a network is intended or the role as an STA for joining a network is intended. In the present exemplary embodiment, the communication apparatuses 102 and 103 operate as enrollees, and thus the role information includes information that the role as an STA is intended. The information included in the setting request frame is encrypted by the shared key generated by the authentication (step S602).

The configurator that has received the setting request frame transmits a setting response frame to the enrollee. An example of the setting response frame is a DPP configuration response frame defined in the WI-FI DPP standard. The setting response frame includes the communication parameters for the configurator to provide. The information included in the setting response frame is encrypted by the shared key generated by the authentication (step S602).

The enrollee that has received the setting response frame decrypts the communication parameters by using the shared key. The enrollee then decrypts the Connector encrypted with the secret key by using the public key dedicated to the configurator, included in the communication parameters, to obtain the communication parameters provided by the configurator.

The provision of the communication parameters from the configurator to the enrollees is completed by thus performing the configuration (step S603). The network introduction (step S604) is then performed.

In step S604 (network introduction), the devices having completed the processing up to the configuration (step S603) check whether they can join the network 104 by using the communication parameters provided by the configurator. If the communication parameters provided by the configurator are those of an infrastructure network, the process of this step is started by the transmission of a search request from the devices operating as an STA. In the present exemplary embodiment, the communication apparatuses 102 and 103 that are STA terminals transmit a search request to the communication apparatus 101 that is an AP terminal.

Initially, an STA terminal checks the AKM included in a beacon or probe response frame transmitted from the AP terminal to see whether information indicating that DPP is supported is included. The AKM included in the frames exchanged during the configuration (step S603) may be used for this check. If the information indicating that DPP is supported is included in the frame transmitted from the AP terminal, the STA terminal transmits a search request to the AP terminal. An example of the search request is a DPP peer discovery request frame defined in the WI-FI DPP standard. The search request includes the Connector encrypted by the secret key dedicated to the configurator.

The AP terminal having received the search request checks whether the Connector included in the search request can be decrypted with the public key dedicated to the configurator. If the Connector received from the STA terminal is found to be successfully decrypted, the AP terminal transmits a search response that is connection permission to the STA terminal. An example of the search response is a DPP peer discovery response frame defined in the WI-FI DPP standard. In step S605, the STA terminal having received the connection permission performs needed connection processing with the AP terminal, such as 4-way handshake, to join the network 104.

If the frame transmitted from the AP terminal does not include information indicating that DPP is supported, i.e., the frame indicates that the AP terminal is a legacy terminal, the STA terminal performs the following processing instead of steps S604 and S605. The STA terminal refers to the legacy PSK/passphrase, and sets the legacy PSK/passphrase as an encryption key for the STA terminal. The STA terminal then connects to the AP terminal by using the WPA/WPA2 protocol.

The communication apparatuses 102 and 103 perform the foregoing process of steps S601 to S605 to join the network 104 established by the communication apparatus 101, whereby a wireless connection between the communication apparatus 101 and the communication apparatuses 102 and 103 is established.

If an error is detected in any of steps S601 to S605, the communication apparatuses 101, 102, and 103 exit the present sequence. The communication apparatus 101 then performs the process of step S403 in FIG. 4, and the communication apparatuses 102 and 103 perform the process of step S502 in FIG. 5 and make a determination of NO. If an error is detected, the communication apparatuses 101, 102, and 103 may notify the user of the error. The communication apparatuses 101, 102, and 103 may perform the present sequence again from the beginning or from the processing where the error occurred, instead of performing the process of step S403 in FIG. 4 or step S502 in FIG. 5. The communication apparatuses 101, 102, and 103 may be configured to count the number of errors having occurred, and abort the processing of the flowcharts of FIGS. 4 and 5 if the number of errors occurred exceeds a predetermined value.

If there is a plurality of enrollees as in the present exemplary embodiment, the processing of FIG. 6 is performed once between the configurator and each enrollee. Specifically, the processing of FIG. 6 is performed once between the communication apparatuses 101 and 102 and once between the communication apparatuses 101 and 103, i.e., twice in total.

If the communication apparatuses 101, 102, and 103 have a code intended for a different purpose than that of the time synchronization code and perform bootstrapping processing using the code, the configurator may provide communication parameters different from those of the network 104. Such communication parameters are used when the communication apparatus 101 establishes a network different from the network 104 and when the communication apparatuses 102 and 103 join the network.

The processing to be executed when the communication apparatus 101 and the communication apparatuses 102 and 103 share the communication parameters and establish a wireless connection has been described above with reference to FIG. 6.

In the present exemplary embodiment, the communication apparatuses 101, 102, and 103 perform the communication parameter sharing processing in compliance with the WI-FI DPP standard. However, this is not restrictive, and the communication apparatuses 101, 102, and 103 may perform communication parameter sharing processing compliant with the WPS standard. In such a case, the communication apparatuses 101, 102, and 103 perform personal identification number (PIN) based communication parameter sharing processing compliant with the WPS standard. In performing the PIN based communication parameter sharing processing compliant with the WPS standard, the communication apparatuses 101, 102, and 103 perform the communication parameter sharing processing by using a time synchronization PIN, like the time synchronization code used in the communication parameter sharing processing compliant with the WI-FI DPP standard.

In the communication parameter sharing processing compliant with the WPS standard, each communication apparatus is assigned the role of a registrar that provides communication parameters or an enrollee that receives the communication parameters provided by the registrar. In the present exemplary embodiment, the communication apparatus 101 having the AP function performs the communication parameter sharing processing compliant with the WPS standard as a registrar, and the communication apparatuses 102 and 103 having the STA function as enrollees. The communication parameter sharing processing compliant with the WPS standard will be described below.

Initially, a PIN (here, time synchronization PIN) stored in an enrollee is input to the registrar. The PIN is input to the registrar by the user entering the PIN displayed on the display unit of the enrollee into the registrar. Alternatively, the PIN may be input from the enrollee to the registrar by BLUETOOTH® communication, NFC communication, or wired communication. The registrar may store the same time synchronization PIN as that of the enrollee in advance, and perform the communication parameter sharing processing using that PIN when instructed to start time synchronization processing from the user.

The enrollee performs calculation processing based on a predetermined algorithm by using a value A on the stored time synchronization PIN when instructed to start time synchronization processing. The enrollee thereby calculates a calculation result PKe. The enrollee transmits the calculation result PKe to the registrar. The enrollee also transmits the value A used in the calculation to the registrar.

The registrar performs calculation processing based on the same predetermined algorithm as that of the enrollee by using the input time synchronization PIN and the received value A. The registrar thereby calculates a calculation result PKe'. If PKe' calculated by the own apparatus coincides with PKe received from the enrollee, the registrar transmits the communication parameters to the enrollee. If PKe' and PKe do not coincide, the registrar does not transmit the communication parameters but a notification indicating an error to the enrollee. With the communication parameters shared, the registrar and the enrollee start wireless communication using the shared communication parameters.

If the enrollee and the registrar perform the calculation by using the same PIN, the calculation results coincide. If the enrollee and the registrar perform the calculation by using different PINs, the calculation results do not coincide and the communication parameters will not be shared. In the present exemplary embodiment, the enrollees and the registrar use the time synchronization PIN so that only the communication apparatuses intended for time synchronization participate in the network 104.

The enrollee may store a PIN for establishing a network intended for a different purpose than time synchronization aside from the time synchronization PIN. If the registrar also stores PINs, the registrar may also store the PIN for establishing a network intended for a different purpose than time synchronization as in the enrollee. The enrollee and the registrar may establish a network different from the network 104 by performing communication parameter sharing processing using the PIN for establishing a network intended for a difference purpose than time synchronization, and perform processing, such as interlocked imaging.

The communication apparatuses 101, 102, and 103 may be ones capable of performing both the communication parameter sharing processing compliant with the WPS standard and the communication parameter sharing processing compliant with the WI-FI DPP standard.

Next, processing that the communication apparatus 101 and the communication apparatuses 102 and 103 execute in performing the time synchronization processing will be described with reference to FIGS. 7, 8, and 9. FIG. 7 is a sequence diagram illustrating the processing executed when the communication apparatus 101 and the communication apparatuses 102 and 103 perform the time synchronization processing. FIG. 8 is a flowchart illustrating processing implemented by the control unit 202 of the communication apparatus 101 reading a computer program stored in the storage unit 203 and executing the program. FIG. 9 is a flowchart illustrating processing implemented by the communication apparatuses 102 and 103 each reading a computer program stored in the storage unit 203 into the control unit 202 and executing the program.

In the present exemplary embodiment, the communication apparatus 101 and the communication apparatuses 102 and 103 use timing measurement protocol (hereinafter, referred to as TM protocol) defined in IEEE 802.11v as a protocol for time synchronization. In the present exemplary embodiment, the time synchronization processing is performed with the communication apparatus 101 as a master terminal and the communication apparatuses 102 and 103 as slave terminals. However, either one of the communication apparatuses 102 and 103 may serve as a master terminal. In such a case, the communication apparatus 101 serves as a slave terminal.

Initially, a procedure of the TM protocol will be described with reference to FIG. 7.

In step S701, the master terminal transmits an action frame defined in the IEEE 802.11 series standard to a slave terminal. In transmitting this frame, the master terminal stores the transmission time T1 of the action frame.

The slave terminal having received the action frame transmitted in step S701 stores the reception time T2 at which the action frame is received. In step S702, the slave terminal transmits an ACK frame as a response to the action frame. Here, the slave terminal stores the transmission time T3 of the ACK frame.

Having received the ACK frame, the master terminal stores the reception time T4 of the ACK frame. In step S703, the master terminal transmits an action frame to the slave terminal. The action frame transmitted in this step includes information about T1 and T4. In transmitting the action frame in step S703, the master terminal stores the transmission time T'1.

The slave terminal having received the action frame transmitted in step S703 stores the reception time T'2. In step S704, the slave terminal transmits an ACK frame to the master terminal. Here, the slave terminal stores the transmission time T'3 at which the ACK frame is transmitted.

The master terminal having received the ACK frame transmitted in step S704 stores the reception time T'4. Although not illustrated in FIG. 7, in a case where the master terminal transmits an action frame next time after step S704, the master terminal includes information about the transmission time T'1 and the reception time T'4 into the action frame. The slave terminal can obtain T1, T2, T3, and T4 (or T'1, T'2, T'3, and T'4) by periodically repeating such processing. The slave terminal can thus calculate a delay time Td between the master terminal and the slave terminal. Assuming that the time needed to transmit a frame from the master terminal to the slave terminal and the time needed to transmit a frame from the slave terminal to the master terminal are the same, the delay time Td is determined by the following equation:

$$Td = ((T4-T1)-(T3-T2))/2. \tag{1}$$

A difference To in time between the master terminal and the slave terminal is determined by the following equation:

$$To = T2 - (T1 + Td) \tag{2}$$

The slave terminal can achieve time synchronization with the master terminal by adding To to its own time.

According to the TM protocol, the times T1 to T4 are defined in 32 bits, with 10 nanoseconds as a bit. The master terminal and the slave terminal are not capable of synchronization of their system time (time information including year, month, and date). When transmitting an action frame, the master terminal then implements synchronization in terms of year, month, and date by adding the system time (e.g., expressed in 64 bits with one nanosecond as a bit) to a vendor specific identifier (ID) area.

In the present exemplary embodiment, the time synchronization between the master terminal and the slave terminal is performed by using both the 32-bit time information and the 64-bit time information. Specifically, the 64-bit time information is used for time synchronization in large units such as year, month, and date. The 32-bit time information is further used for time synchronization in small units.

If the TM protocol is used to perform time synchronization, the master terminal and the slave terminal can check whether the TM protocol is supported before an action frame is transmitted in step S701. If both the master terminal and the slave terminal are assumed to support the TM protocol as in the present exemplary embodiment, a support check for the TM protocol may be omitted. If a support check for the TM protocol is performed, the master terminal and the slave terminal make the check before starting the sequence of FIG. 7.

In the present exemplary embodiment, the master terminal and the slave terminal use the TM protocol as the protocol for time synchronization. However, this is not restrictive. The Network Time Protocol (NTP) and the Precision Time Protocol (PTP) may be used. Even when using a protocol other than the TM protocol, the master terminal and the slave terminal perform time synchronization by the slave terminal adjusting to the time of the master terminal.

FIG. 8 is a flowchart illustrating an example of the operation of the master terminal in the time synchronization sequence illustrated in FIG. 7. In the present exemplary embodiment, the communication apparatus 101, which is the master terminal, performs the processing of the present flowchart as step S406 of FIG. 4. FIG. 9 is a flowchart illustrating an example of the operation of the slave terminal in the time synchronization sequence illustrated in FIG. 7. In the present exemplary embodiment, the communication apparatuses 102 and 103, which are slave terminals, perform the processing of the present flowchart in step S504 of FIG. 5.

In step S801, the master terminal transmits an action frame for time synchronization to the slave terminal, and stores the transmission time T1 at that time. Here, the master terminal stores not only the 32-bit time but the system time (64 bits) as well.

In step S901, the slave terminal determines whether an action frame is received from the master terminal. If the slave terminal determines that no action frame is received (NO in step S901), the slave terminal again performs the process in step S901. If the slave terminal determines that an action frame is received (YES in step S901), the slave terminal stores the reception time T2 of the action frame, and the processing proceeds to step S902. Here, the slave terminal stores not only the 32-bit time but the system time (64 bits) as well.

In step S902, the slave terminal having received the action frame transmits an ACK frame to the master terminal. The slave terminal stores the transmission time T3 of the ACK frame. Here, the slave terminal stores both the 32-bit time and the 64-bit system time.

Meanwhile, in step S802, the master terminal having transmitted the action frame in step S801 determines whether an ACK frame is received from the slave terminal. If the master terminal determines that no ACK frame is received (NO in step S802), the master terminal again performs the process in step S802. If the master terminal determines that an ACK frame is received (YES in step S802), the master terminal stores the reception time T4, and the processing proceeds to step S803. Here, the master terminal stores both the 32-bit time and the 64-bit system time.

Meanwhile, in step S903, the slave terminal having performed the process of step S902 calculates Td and To. If an action frame including information about the times T1 and T4 is not yet received from the master terminal, the process in step S903 is skipped since the slave terminal is unable to calculate Td and To.

In step S904, the slave terminal determines whether a time synchronization end condition is satisfied. Since Td and To are not successfully calculated in step S903, the slave terminal makes a determination of NO this time. The processing returns to step S901.

Meanwhile, in step S803, the master terminal having performed the process of step S802 transmits an action frame including information about the stored times T1 and T4 to the slave terminal. The master terminal transmits both the 32-bit time and the 64-bit system time for each of the times T1 and T4. In transmitting the action frame in step S803, the master terminal stores the transmission time T'1 in the form of a 32-bit time and a 64-bit system time.

Having received the action frame from the master terminal, the slave terminal makes a determination of YES in step S901, and stores the reception time T'2. Here, the slave terminal stores the 32-bit time and the 64-bit system time.

In step S902, the slave terminal transmits an ACK frame to the master terminal. The slave terminal here stores the transmission time T'3. As with the time T'2, the slave terminal stores not only the 32-bit time but the 64-bit system time as well.

Meanwhile, in step S804, the master terminal having transmitted the action frame in step S803 determines whether an ACK frame is received from the slave terminal. If an ACK frame is not yet received (NO in step S804), the processing returns to step S804. On the other hand, if an ACK frame is received (YES in step S804), the processing proceeds to step S805.

In step S903, the slave terminal having performed the process of step S902 calculates Td and To. The slave terminal can execute the calculation in this step since the times T1 and T4 have been received from the master terminal.

In step S904, the slave terminal having calculated Td and To determines whether the time synchronization end condition is satisfied. Specifically, the slave terminal makes a determination of YES if Td and To are calculated a predetermined number of times or more. The slave terminal makes a determination of NO if Td and To are calculated less than the predetermined number of times. Another example of the determination method in this step is to check for the convergence of the delay time Td by statistically processing the calculation results. In such a case, the slave terminal makes a determination of YES if the delay time Td converges sufficiently. The slave terminal makes a determination of NO if sufficient convergence is not observed. If the determination in step S904 is NO (NO in step S904), the processing proceeds to step S901. If the determination in step S904 is YES (YES in step S904), the processing proceeds to step S905.

In step S905, the slave terminal corrects the time of the slave terminal itself by using Td and To calculated in step S903. Td and To used in this step may be averages or statistic values of the respective calculations.

In step S906, the slave terminal having corrected the time of the slave terminal itself transmits a time synchronization end request to the master terminal. The time synchronization end request is a frame for requesting the master terminal to end the time synchronization processing. Specifically, the time synchronization end request is a TM request frame defined in the IEEE 802.11 series standard with "0" set in a trigger field. Alternatively, network disconnection request frames, such as a deauthentication frame and a disassociation frame, may be used.

In step S805, i.e., if the determination in step S804 is YES, the master terminal determines whether a time synchronization end request is received from the slave terminal. If the master terminal determines that a time synchronization end request is not received (NO in step S805), the processing returns to step S803. On the other hand, if the master terminal determines that a time synchronization end request is received (YES in step S805), the processing proceeds to step S806.

In step S806, the master terminal transmits an ACK frame to the slave terminal as a response to the received time synchronization end request. The processing of the flowchart of FIG. 8 ends.

Meanwhile, in step S907, the slave terminal having performed the processing of step S906 determines whether an ACK frame is received from the master terminal. If the slave terminal determines that an ACK frame is not received from the master terminal (NO in step S907), the processing returns to step S907. If the slave terminal determines that an ACK frame is received from the master terminal (YES in step S907), the processing of the flowchart of FIG. 9 ends.

If there is a plurality of slave terminals, the master terminal may perform the time synchronization processing with the respective slave terminals in parallel. Specifically, the master terminal may transmit an action frame of step S701 to a first slave terminal, and then transmit an action frame of step S701 to a second slave terminal.

The processing that the communication apparatus 101 and the communication apparatuses 102 and 103 execute in performing the time synchronization processing has been described above with reference to FIGS. 7, 8, and 9.

If the master terminal broadcasts an action frame in steps S801 and S803 of FIG. 8, a slave terminal or terminals having completed the time synchronization processing also return(s) an ACK frame to the master terminal.

If a slave terminal transmits a wireless connection disconnection request (deauthentication) while the master terminal and the slave terminal are performing the time synchronization processing, the master terminal ends the time synchronization processing with the slave terminal as an error. The master terminal reduces the number of connected terminals counted in step S404 of FIG. 4 by as many as the slave terminals transmitting the wireless connection disconnection request.

If a time synchronization end request is not received from a slave terminal after a lapse of a predetermined time since the transmission of the action frame in step S801 of FIG. 8, the master terminal ends the time synchronization processing with the slave terminal as an error. The master terminal reduces the number of connected terminals counted in step S404 of FIG. 4 by as many as slave terminals from which the time synchronization end request is not received.

While performing the time synchronization processing, the master terminal may transmit an existence confirmation packet to the slave terminals at regular intervals. If a response to the transmitted existence confirmation packet is received from a slave terminal, the master terminal continues the time synchronization processing with the slave terminal. On the other hand, if no response is received from a slave terminal before a predetermined time elapses since the transmission of the existence confirmation packet, the master terminal ends the time synchronization processing with the slave terminal as an error. The master terminal reduces the number of connected terminals counted in step S404 of FIG. 4 by as many as slave terminals from which no response is received.

The slave terminals may transmit an existence conformation packet each time a predetermined time elapses after the start of the time synchronization processing. In such a case, the master terminal continues the time synchronization processing with a slave terminal based on reception of the existence confirmation packet from the slave terminal. If the existence confirmation packet is not received from a slave terminal before a predetermined time elapses since the start of the time synchronization pressing or since the existence confirmation packet is received last time, the master terminal ends the time synchronization processing with the slave terminal as an error. The master terminal reduces the number of connected terminals counted in step S404 of FIG. 4 by as many as slave terminals from which the existence confirmation packet is not received. Before a predetermined time elapses since the start of the time synchronization processing refers to before a predetermined time elapses since the transmission of the action frame by the master terminal in step S801 of FIG. 8.

If the time synchronization processing is ended as an error, the master terminal and the slave terminal may notify the user of the error by providing display indicating the occurrence of the error. The master terminal may display with which slave terminal the time synchronization processing is ended as an error. This enables the user to identify the slave terminal with which the time synchronization processing is not normally completed.

At least part or all of the flowcharts of the communication apparatuses 101, 102, and 103 illustrated in FIGS. 4, 5, 8, and 9 may be implemented by hardware. For hardware implementation, for example, a dedicated circuit generated on a field programmable gate array (FPGA) from the computer programs for implementing the steps by using a predetermined compiler may be used. Like an FPGA, a gate array circuit may be formed for hardware implementation. An application specific integrated circuit (ASIC) may be used for hardware implementation. The steps of the flowcharts illustrated in FIGS. 4, 5, 8, and 9 may be performed by a not-illustrated plurality of CPUs or devices in a distributed manner. The same applies to the sequences illustrated in FIGS. 6 and 7.

While an exemplary embodiment has been described above in detail, exemplary embodiments of the present disclosure may include, for example, a system, an apparatus, a method, a program, and a recording medium (storage medium). Specifically, an exemplary embodiment of the present disclosure may be applied to a system including a plurality of devices (for example, a host computer, an interface device, an imaging apparatus, and a web application), or an apparatus including a single device.

An exemplary embodiment of the present disclosure can be implemented by processing for supplying a program for implementing one or more of the functions of the foregoing exemplary embodiment to a system or an apparatus via a network or a storage medium, and reading and executing the program by one or more processors in a computer of the system or apparatus. A circuit for implementing one or more functions (for example, ASIC) may be used for implementation.

According to an exemplary embodiment of the present disclosure, a communication apparatus can perform time synchronization with another communication apparatus without receiving a user operation for selecting another communication apparatus to perform the time synchronization with from the user.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-207195, filed Nov. 2, 2018, which is hereby incorporated by reference herein in its entirety.

What is claimed is:

1. A communication apparatus comprising:
   at least one memory storing instructions; and
   at least one processor that, upon execution of the stored instructions, is configured to operate as:
   a first establishment unit configured to establish a first wireless network;
   a first reception unit configured to receive first information from another communication apparatus;

a first provision unit configured to provide a first communication parameter for joining the established first wireless network to the other communication apparatus in a case where a first code stored in the communication apparatus and corresponding to time synchronization processing corresponds to the received first information, and configured not to provide the first communication parameter to the other communication apparatus in a case where the first code does not correspond to the first information; and a synchronization unit configured to identify the other communication apparatus joining the first wireless network by using the provided first communication parameter, and cause the other communication apparatus identified to execute the time synchronization processing using time information of the communication apparatus.

2. The communication apparatus according to claim 1, wherein execution of the stored instructions further configures the at least one processor to operate as:

a first calculation unit configured to calculate second information by using the first code; and a determination unit configured to determine whether the calculated second information and the first information received by the first reception unit are related, wherein the first provision unit is configured to provide the first communication parameter to the other communication apparatus in a case where it is determined that the first information and the second information are related, and configured not to provide the first communication parameter to the other communication apparatus in a case where it is determined that the first information and the second information do not coincide.

3. The communication apparatus according to claim 1, wherein execution of the stored instructions further configures the at least one processor to operate as an accepting unit configured to accept a user operation for giving an instruction to start the time synchronization processing, wherein the first reception unit is configured to receive the first information from the other communication apparatus after the user operation is accepted by the accepting unit.

4. The communication apparatus according to claim 1, wherein execution of the stored instructions further configures the at least one processor to operate as:

a second establishment unit configured to establish a second wireless network different from the first wireless network;

a second reception unit configured to receive third information from the other communication apparatus; and a second provision unit configured to provide a second communication parameter for joining the established second wireless network to the other communication apparatus in a case where a second code stored in the communication apparatus and corresponding to processing different from the time synchronization processing corresponds to the received third information, and configured not to provide the second communication parameter to the other communication apparatus in a case where the second code does not correspond to the third information.

5. The communication apparatus according to claim 4, wherein the second provision unit is configured to provide the second communication parameter by using a method compliant with a WI-FI Device Provisioning Protocol (DPP) standard, the method using a public key exchange (PKEX) protocol.

6. The communication apparatus according to claim 4, wherein the second provision unit is configured to provide the second communication parameter by using a personal identification number (PIN) method compliant with a WI-FI Protected Setup (WPS) standard.

7. The communication apparatus according to claim 1, wherein the first provision unit is configured to provide the first communication parameter by using a method compliant with a WI-FI DPP standard, the method using a PKEX protocol.

8. The communication apparatus according to claim 1, wherein the first provision unit is configured to provide the first communication parameter by using a PIN method compliant with a WPS standard.

9. The communication apparatus according to claim 1, wherein execution of the stored instructions further configures the at least one processor to operate as a transmission unit configured to transmit an action frame including the time information about the communication apparatus, wherein the synchronization unit is configured to cause the other communication apparatus identified to execute the time synchronization processing by the transmission unit transmitting the action frame to the other communication apparatus that is identified and joins the first wireless network.

10. The communication apparatus according to claim 9, wherein execution of the stored instructions further configures the at least one processor to operate as a first end unit configured to end the time synchronization processing with the other communication apparatus identified in a case where a response from the other communication apparatus identified is not received before a predetermined time elapses after the action frame is transmitted.

11. The communication apparatus according to claim 1, wherein execution of the stored instructions further configures the at least one processor to operate as:

a transmission unit configured to transmit an existence confirmation packet to the other communication apparatus identified at predetermined intervals in a case where the other communication apparatus that is identified is being caused to execute the time synchronization processing and a second end unit configured to end the time synchronization processing with the other communication apparatus identified in a case where a response from the other communication apparatus identified is not received before a predetermined time elapses after the existence confirmation packet is transmitted.

12. The communication apparatus according to claim 1, wherein execution of the stored instructions further configures the at least one processor to operate as:

a third reception unit configured to receive an end request indicating an end of the time synchronization processing from the other communication apparatus that is identified and is being caused to execute the time synchronization processing; and a third end unit configured to end the established first wireless network based on reception of the end request by the third reception unit.

13. The communication apparatus according to claim 12, wherein execution of the stored instructions further configures the at least one processor to operate as a fourth end unit configured to end the time synchronization processing with the other communication apparatus identified in a case where the third reception unit does not receive the end request before a predetermined time elapses after the time synchronization processing is started.

14. The communication apparatus according to claim 1, wherein the time information includes both a 64-bit representation of a time of the communication apparatus and a 32-bit representation of a time of the communication apparatus.

15. The communication apparatus according to claim 1, wherein the synchronization unit is configured to cause the other communication apparatus identified to execute the time synchronization processing compliant with a timing measurement (TM) protocol.

16. A control method of a communication apparatus, comprising:
    establishing a wireless network;
    receiving first information from another communication apparatus;
    providing a communication parameter for joining the established wireless network to the other communication apparatus in a case where a first code stored in the communication apparatus and corresponding to time synchronization processing corresponds to the received first information, and not providing the communication parameter to the other communication apparatus in a case where the first code does not corresponds to the first information; and
    identifying the other communication apparatus joining the wireless network by using the provided communication parameter, and causing the other communication apparatus identified to execute the time synchronization processing using time information of the communication apparatus.

17. A non-transitory computer-readable storage medium storing a computer program for causing a computer to execute a control method of a communication apparatus, the control method comprising:
    establishing a wireless network;
    receiving first information from another communication apparatus;
    providing a communication parameter for joining the established wireless network to the other communication apparatus in a case where a first code stored in the communication apparatus and corresponding to time synchronization processing corresponds to the received first information, and not providing the communication parameter to the other communication apparatus in a case where the first code does not corresponds to the first information; and
    identifying the other communication apparatus joining the wireless network by using the provided communication parameter, and causing the other communication apparatus identified to execute the time synchronization processing using time information of the communication apparatus.

* * * * *